(12) United States Patent
Dorney et al.

(10) Patent No.: US 7,824,125 B2
(45) Date of Patent: Nov. 2, 2010

(54) CLAMPING ASSEMBLIES

(75) Inventors: Jarrod Leigh Dorney, Warnambool (AU); Paul Van De Loo, Norton Summit (AU); Kenneth Gransbury, Kensington Park (AU)

(73) Assignee: Rapidjoint Pty Ltd, Victoria (AU)

( * ) Notice: Subject to any disclaimer, the term of this patent is extended or adjusted under 35 U.S.C. 154(b) by 638 days.

(21) Appl. No.: 10/598,602

(22) PCT Filed: Feb. 28, 2005

(86) PCT No.: PCT/AU2005/000282

§ 371 (c)(1),
(2), (4) Date: Jun. 8, 2007

(87) PCT Pub. No.: WO2005/085657

PCT Pub. Date: Sep. 15, 2005

(65) Prior Publication Data

US 2007/0252318 A1 Nov. 1, 2007

(30) Foreign Application Priority Data

Mar. 3, 2004 (AU) .............................. 2004901112
Jun. 28, 2004 (AU) .............................. 2004903527

(51) Int. Cl.
*F16B 12/14* (2006.01)
(52) U.S. Cl. ..................... 403/374.4; 403/257; 403/259; 403/DIG. 12; 403/DIG. 10; 312/263; 312/265.5
(58) Field of Classification Search ................. 403/256, 403/257, 258, 259, 373, 374.3, 374.4, DIG. 10, 403/DIG. 12, DIG. 13; 52/239, 240; 312/263, 312/265.5, 108; 411/104, 402, 432, 84, 85
See application file for complete search history.

(56) References Cited

U.S. PATENT DOCUMENTS 5,076,748 A * 12/1991 Waterfield et al. ............ 411/84

(Continued)

FOREIGN PATENT DOCUMENTS

AU 35441/93 9/1993

(Continued)

OTHER PUBLICATIONS

"International Preliminary Report on Patentability" for International (PCT) Patent Application No. PCT/AU2005/000282, issued on Sep. 5, 2006, 6 pages.

(Continued)

*Primary Examiner*—Michael P Ferguson
(74) *Attorney, Agent, or Firm*—Sheridan Ross P.C.

(57) ABSTRACT

A self-aligning coupling device for installation in a channel having an open end and a pair of substantially parallel side walls. The device includes an elongate connecting portion having a longitudinal axis, a channel abutment portion, and at least one laterally projecting lug. In use, the coupling device is installed in the channel with the channel abutment portion located at least partially within the channel and the laterally projecting lug located outside the open end of the channel. The channel abutment portion is formed such that when aligned in a first angular position within the channel it abuts the side walls of the channel to prevent rotation of the device in a first rotational direction about said longitudinal axis, while allowing rotation in a second, opposed rotational direction. The lug is formed such that in said first angular position it extends beyond at least one of the side walls of the channel. When the coupling device is retracted into the channel while simultaneously applying a torque to rotate the device in said first rotational direction towards said first angular position, the channel abutment portion abuts the side walls of the channel thereby aligning the lug to extend beyond at least one of the side walls of the channel and preventing the coupling device from being fully retracted into the channel. Various methods and apparatus for applying suitable translational and rotational forces to the self-aligning coupling device, and to form adjustable clamp assemblies, are also provided.

17 Claims, 12 Drawing Sheets

U.S. PATENT DOCUMENTS

| | | | |
|---|---|---|---|
| 5,123,629 | A | 6/1992 | Takeuchi |
| 5,199,836 | A * | 4/1993 | Gogarty .................. 411/84 |
| 5,647,174 | A * | 7/1997 | Mattarelli .................. 403/373 |
| 5,810,333 | A | 9/1998 | Hickerson et al. |
| 5,934,819 | A * | 8/1999 | Mangold .................. 403/256 |
| 6,733,221 | B2 * | 5/2004 | Linger .................. 411/84 |
| 6,764,245 | B2 * | 7/2004 | Popovski .................. 403/256 |
| 7,159,288 | B2 | 1/2007 | Van De Loo et al. |

FOREIGN PATENT DOCUMENTS

| | | |
|---|---|---|
| CH | 601681 | 7/1978 |
| DE | 8023825 | 12/1980 |
| DE | 3036560 | 5/1982 |
| DE | 3146805 | 6/1983 |
| DE | 9010431 | 9/1990 |
| DE | 4440739 | 6/1995 |
| DE | 29717630 | 11/1997 |
| DE | 29818837 | 1/1999 |
| DE | 29819955 | 4/1999 |
| EP | 0292921 | 11/1988 |
| JP | 08135029 | 5/1996 |
| JP | 08-159121 | 6/1996 |
| JP | 2000-130414 | 5/2000 |
| JP | 2001289501 | 10/2001 |
| WO | 03/035992 | 5/2003 |
| WO | 03/095847 | 11/2003 |
| WO | 2004/014611 | 2/2004 |

OTHER PUBLICATIONS

International Search Report dated May 20, 2005, for PCT Application No. PCT/AU2005/000282.

Supplementary European Search Report for European Patent Application No. 05706316, dated Nov. 4, 2009.

Supplementary European Search Report for European Patent Application No. 03783842.2, dated Aug. 30, 2007.

Supplementary partial European Search Report for European Patent Application No. 03783842.2, dated Jun. 4, 2007.

Written Opinion dated May 20, 2005, for PCT Application No. PCT/AU2005/000282.

International Search Report for International (PCT) Application No. PCT/AU2003/01007, mailed Sep. 1, 2003.

Examination Report for European Patent Application No. 03783842. 2, dated Jan. 15, 2008.

Official Action for U.S. Appl. No. 10/524,220, mailed Sep. 28, 2005.

Official Action for U.S. Appl. No. 10/524,220, mailed Mar. 14, 2006.

Notice of Allowance for U.S. Appl. No. 10/524,220, mailed Aug. 14, 2006.

Supplemental Notice of Allowability for U.S. Appl. No. 10/524,220, mailed Nov. 15, 2006.

* cited by examiner

CLAMPING ASSEMBLIES

CROSS REFERENCE TO RELATED APPLICATION

This application is a national stage application under 35 U.S.C. 371 of PCT Application No. PCT/AU2005/000282 having an international filing date of Feb. 28, 2005, which designated the United States, which PCT application claimed the benefit of Australian Application Serial No. 2004901112, filed Mar. 3, 2004, and Australian Application Serial No. 2004903527, filed Jun. 28, 2004, the entire disclosures of which are hereby incorporated herein by reference.

FIELD OF THE INVENTION

The present invention relates generally to adjustable clamps, and more particularly to improvements in clamping assemblies of the type commonly used within cutaway portions or cavities of articles for holding such articles together.

BACKGROUND OF THE INVENTION

It is known to use adjustable clamp assemblies, for example, to couple two objects together through a clamping action. FIG. 1 illustrates an example in which two elongate objects A and B are to be clamped together end to end. The objects may be made of any material that is practical for the purpose for which the clamped objects are used, and in particular may be made of wood, chipboard or the like, or of other materials such as plastics and/or metals including steel or aluminium where suitable.

A known approach for clamping such objects together end to end involves creating cut-out portions in the objects, and using clamps to pull the cut-out portions together. An example of a suitable known cut-out arrangement is shown in FIG. 2.

In FIG. 2, the cut-out arrangement includes cut-away portions A", B" made in objects A and B respectively, so that known clamp mechanism 200 can be inserted into the combined cut-away portion A", B".

The known clamp mechanism 200 includes a first clamp member 202 that abuts an inner surface 203 of cut-away portion B", and a second clamp member 204 that abuts a corresponding inner surface of cut-away portion A". The clamp members 202, 204 are connected by a shaft 206 that passes through respective holes (not shown) in the clamping members 202, 204. The shaft 206 is free to rotate within the holes in the clamping members 202, 204, and is provided with a head portion 208 at one end that abuts an outer surface of the second clamping member 204.

The end of the shaft 206 opposed to the head 208 is provided with a screw thread 210, with which a nut 212 (shown in cross-section) is threadably engaged. The nut 212 abuts an outer surface of the first clamping member 202. Accordingly, by tightening the nut 212, the two clamping members 204, 202 are drawn together, thus drawing the cut-away portions A", B"together in order to clamp together the objects A, B.

The problem remains, however, that it is difficult in many circumstances to manipulate the known clamp 200 in cut-away portions such as the ones designated as A", B" in FIG. 2. In order to tighten the nut 212, it is necessary to use a spanner or other form of lever arm, which requires the spanner or lever arm to be swept through an arc. Thus, when the clamp 200 resides in the cut-away portion A", B" it may be difficult to sweep the spanner or lever arm through the arc, because the walls and surface of the objects A, B tend to obstruct the sweep of the arc. At best, it is necessary to manipulate the spanner in very small increments, because the walls of the cut-away portion, B" limit the sweep of the arc.

Exacerbating the difficulty is the fact that, in use, this form of clamping is often employed on the under surfaces of benches or tables, or within concealed cavities of handrails or sections of other assemblies, where the inaccessibility of the clamp within a confined area may be a problem.

One clamp known in the prior art which attempts to overcome the above disadvantages is described in WO 03/035992. This prior art clamp provides a first bevelled gear member at one end of the clamp mechanism. A special tool is then provided which engages with a pivot locator positioned in a clamp member located adjacent to the end of the clamp mechanism including the first bevelled gear member. The tool includes a second bevelled gear member that engages with the first bevelled gear member, such that the clamp may be operated by a rotation of the tool about its axis, which lies perpendicular to the axis of the clamp mechanism. Accordingly, the clamp may be operated without the necessity to sweep a spanner or lever through an arc that is obstructed by the walls and surfaces of the objects A, B.

However, there remain a number of disadvantages of the clamp disclosed in WO 03/035992. First, the clamp requires a special tool for its operation. This is a particular disadvantage for tradespersons, who are among the main users of these types of clamps, because the clamp tool must be stored, carried and kept on hand along with other tools of the trade. The clamp tool may easily be misplaced, lost, or simply not be within reach at the moment it is required. It is accordingly preferable that the clamp may be operated using a general purpose tool, such as a screwdriver or similar, that the tradesperson will always require and have on hand in the course of work.

Furthermore, applying a tightening torque using the tool, it may easily slip from the pivot locator, which may result in injury to the operator, and/or stripping of the bevelled gears on the clamp mechanism and the tool.

A number of alternative clamp designs are described in the present inventors' prior International Pat. application No. PCT/AU03/01007 that overcome some of the problems known in earlier clamps. Embodiments disclosed therein employ either a cam or worm gear arrangement to provide clamps that may be manipulated using a standard screwdriver or the like rotated about an axis perpendicular to the axis of the clamp mechanism. An embodiment 300 using a worm gear arrangement is shown in FIG. 3.

The adjustable clamp assembly 300 includes first and second clamp members 330, 320 having respective facing inner surfaces 331, 321 adapted to abut against the wall surfaces 203, 205 shown in FIG. 2. The assembly 300 further includes a shaft 340 having a threaded portion 341 at one end.

A sleeve member 356 is provided which has an internal thread, enabling it to be connected to the threaded portion 341 of the shaft 340 by screw-thread engagement. The first clamp member 330 includes holes allowing the rod 340 to pass through.

A worm gear assembly 350 incorporates a worm gear 351 and a worm wheel 352. Accordingly, rotation of the worm gear 351 causes rotation of the sleeve 356, which in turn causes the inner surfaces 321, 331 of the clamp components 320, 330 to be either drawn together or apart along a path of linear motion, depending on the direction of the rotation of the sleeve.

The worm gear 351 is located within a bracket 354 that is integrally formed with the first clamp member 330. The first clamp member 330 thus consists of an integral unit that enables the gear assembly to be entirely contained within one of the cut-away portions, eg A".

However, the above-described clamping assemblies do not fully satisfy the needs of users of such clamps, and there is therefore an ongoing need for improved means of coupling objects that provide additional advantages, such as enabling further efficiencies to be achieved in installation, and/or that mitigate at least some of the limitations of prior art clamping assemblies.

It is to be noted that any discussion of documents, devices, acts or knowledge in this specification is included to explain the context of the invention. It should not be taken as an admission that any of the material formed part of the prior art base or the common general knowledge in the relevant art on or before the priority date of the claims herein.

SUMMARY OF THE INVENTION

As will be apparent from the foregoing discussion, it is generally necessary to install the complete clamp assembly into a recess or cavity, for example cutaway portions A" and B" of objects A, B shown in FIGS. 1 and 2, by inserting it into the recess when assembling an article by clamping the objects together. The present inventors have recognised that, in some circumstances, it may be desirable to preinstall a clamping assembly into an object, eg B, at the time of manufacture, or shortly thereafter, and subsequently engage a clamp member, eg 204, within a recess, eg cutaway portion A" of object A, on site when assembling a complete article from the objects. The objects may be, for example, sections of a kitchen bench top that are assembled to form a complete bench top, sections of a handrail of a staircase, or other articles or portions thereof that are to be clamped together to form a complete product or assembly.

In this case, the inventors have recognised that it is particularly desirable that the clamp assembly be retracted entirely within cutaway portion B" until it is required to assemble the complete article by coupling object A to object B. Using the known clamp assembly shown in FIG. 2, it is not generally possible to fully retract clamp member 204 into the cutaway channel in object B. Furthermore, it is still necessary to slot the extended connection member 206 and clamp member 204 into cutaway portion A". In order to do so, it is of course necessary that cutaway portion A" be open and readily accessible during construction. It is not possible using the assembly shown in FIG. 2 to extend the clamp member 204 directly into the open end of cutaway portion A" formed in the end surface of object A at which the objects are to be clamped together. The clamp member 204 may be too large to fit within the channel of cutaway portion A", even when rotated by 90 degrees with respect to the orientation shown in FIG. 2, and in any case the clamping assembly 200 provides no mechanism to ensure that once the clamp member 204 is in place within the desired region of cutaway A", it is then rotated into an appropriate orientation to bear against the inner surface of the cutaway portion A".

In particular, the inventors have recognised that a clamping assembly such as that shown in FIG. 2 cannot be used reliably if cutaway portion A" is entirely enclosed within object A such that the only point of entry for the clamp member 204 and connection member 206 is via the opening in the end surface of object A that is to be clamped against object B. The alternative assembly 300 shown in FIG. 3, although an improvement over clamping assembly 200 in other respects, does not provide a solution to this problem.

Accordingly, in one aspect the present invention provides a self aligning coupling device for installation in a channel having an open end and a pair of substantially parallel side walls, the device including:

an elongate connecting portion having a longitudinal axis;

a channel abutment portion; and at least one laterally projecting lug, arranged such that in use the coupling device may be installed in the channel with the channel abutment portion located at least partially within the channel and the laterally projecting lug located outside the open end of the channel, the channel abutment portion being formed such that when aligned in a first angular position within the channel it abuts at least one said side wall of the channel to prevent rotation of the device in a first rotational direction about said longitudinal axis, while allowing rotation in a second, opposed, rotational direction, and the lug being formed such that in said first angular position it extends beyond at least one of the side walls of the channel, whereby when the coupling device is retracted into the channel while simultaneously applying a torque to rotate the device in said first rotational direction towards said first angular position, the channel abutment portion will abut the side walls of the channel thereby aligning the lug to extend beyond at least one of the side walls of the channel to prevent the coupling device from being fully retracted into the channel.

Accordingly, once the coupling device has been inserted into a channel such that the projecting lug is outside the open end of the channel, the action of subsequently retracting the device while applying a torque causes it to self-align such that the projecting lug is blocked from re-entering the channel due to its extension beyond the side wall of the channel. Therefore, when a coupling device in accordance with the invention is used as part of a clamp assembly to couple or clamp two objects together, it is not necessary to be able to access the open end of the channel, or to manually align the lug to ensure the correct engagement of the coupling device with a surface adjacent to the side walls of an open end of the channel in order to apply a clamping force thereto.

It is preferred that the coupling device includes two opposing laterally projecting lugs formed to extend beyond both side walls of the channel when the coupling device is aligned in the channel in said first angular position. This arrangement provides improved support and stronger clamping force by enabling the coupling device to engage with adjacent surfaces on both sides of the open end of the channel.

In preferred embodiments, the lug or lugs are formed so that when they are aligned substantially parallel to the side walls of the channel they are able to fit therebetween such that the coupling device is able to slide freely within the channel.

Accordingly, preferred embodiments of the device can be installed in the channel from an opening at a far end opposed to said open end by aligning the lugs in this manner and sliding the device through the channel. In this case, there is no need for access to the channel via an open face. The channel may therefore by wholly embedded within an object. Even where the channel has an accessible open face, it may in many cases be faster to install the coupling device by inserting it into the channel from the far end.

In particular, a clamping assembly including a coupling device in accordance with a preferred embodiment of the invention may be preinstalled in an object, such as a bench top, which may then be rapidly clamped to an adjacent bench top by operating an adjustable engagement assembly of the clamp to extend the coupling device into a channel formed in a cutaway portion in the second bench top.

It is further preferred that the channel abutment portion is formed such that when the lugs are aligned substantially parallel to the side walls of the channel, the channel abutment portion is aligned within the channel in a second angular position at which it abuts the side walls of the channel to prevent rotation of the device in said second rotational direction about said longitudinal axis, while allowing rotation in said first rotational direction.

In this preferred arrangement, the coupling device may be installed in the channel by extending it through the channel from the far end opposed to said open end, while simultaneously applying a torque to rotate the device in said second rotational direction. The stopping of the channel abutment portion at said second angular position ensures that the lugs remain aligned parallel to the side walls of the channel, even if they have been extended to a location outside the open end of the channel.

In preferred embodiments, therefore, the coupling device of the present invention provides for particularly simple installation, by first extending the coupling device through the channel while applying a torque in said second rotational direction, until the lugs are wholly extended to a location outside the open end of the channel. Subsequently, the coupling device may be retracted while applying a torque in said first rotational direction causing the coupling device to rotate into said first angular position, whereby the lugs prevent the coupling device from being fully retracted into the channel, and may bear against a surface or surfaces adjacent to the open end of the channel in order to apply a clamping force.

The elongate connecting portion may include a cylindrical portion having a thread formed thereon for screw thread engagement with a cooperatively threaded adjustment member.

According to such preferred arrangements, rotation of the threaded adjustment member results in translation of the coupling device along the channel, while, additionally, friction between the thread of the elongate connecting portion and the cooperative thread of the adjustment member, applies a torque to the coupling device. Accordingly, installation of the coupling device by simultaneous application of appropriate torque while first extending and then retracting the coupling device through the channel is simply carried out by operation of the adjustment member in the usual manner.

Part or all of the thread formed on the elongate connecting portion may be manufactured so as to be a snug fit with the adjustment member in order to increase the friction therebetween, and provide a suitable level of torque. Alternatively, if required, a thin coating of a suitable material, such as a wax or lacquer, may be applied to the thread to increase friction and torque.

In a particularly preferred embodiment, the coupling device includes two lugs integrally formed at an end thereof, to form a head portion having substantially rectangular cross section. The dimension of the rectangular cross section along a major axis thereof is preferably greater than the channel width such that when located outside the open end of the channel with said major axis perpendicular to the channel walls, corresponding to the first angular position, the lugs prevent the device from being fully retracted into the channel.

Further, it is preferred that a dimension of the rectangular section along a minor axis thereof is less then the channel width to enable the head portion to fit between the side walls when aligned with the minor axis perpendicular to the channel walls, corresponding to the second angular position of the device.

The substantially rectangular cross-section may include rounded portions at corners thereof to prevent corresponding edges of the head portion catching on a surface of an object in which the channel is formed, when rotating between the first and second angular positions.

Preferably, the first and second angular positions are arranged substantially at right angles to one another.

The edges and corners at the end of the head portion may be rounded or smoothed to ensure that there are no angular corners or edges that may catch on a surface of an object in which the channel is formed when the device slides within the channel.

The head portion preferably includes surfaces formed to bear against corresponding surfaces adjacent to the open end of the channel.

The channel abutment portion preferably includes two pairs of flat surfaces, each pair of surfaces meeting at an edge therebetween, and the pairs being substantially opposed to each other relative to the longitudinal axis of the coupling device.

According to this preferred arrangement, in each of said first and second angular positions, one of each of said pairs of surfaces is located adjacent to a respective side wall of the channel.

It is particularly preferred that each of said pairs of surfaces meet at right angles, and are arranged such that in each of said first and second angular positions one of each of said pairs of surfaces bears against a respective side wall of the channel.

The pairs of surfaces are preferably opposed along an axis oriented at 45 degrees to the major and minor axes of the rectangular cross-section of the head portion of the coupling device. Accordingly, in preferred arrangements said first and second angular positions are substantially at right angles to each other such that in the first angular position the head portion is aligned with its major axis perpendicular to the channel walls, and the second angular position the head portion is aligned with its minor axis perpendicular to the channels walls.

It is further preferred that the channel abutment portion is tapered, such that a width thereof proximate to the head portion is greater than a width proximate to the connecting portion. Advantageously, this arrangement of the abutment portion facilitates an increased degree of relative lateral movement of two objects to be clamped together, when a moderate clamping force is applied, to assist in aligning said objects with one another.

In a particularly preferred embodiment, the channel abutment portion is formed integrally with the head portion, such that one of each of said pairs of surfaces is continuous with a corresponding surface of the head portion located on a side parallel to the major axis of the substantially rectangular cross-section. Accordingly, in the second angular position, the head portion and channel abutment portion fit within the channel with said continuous surfaces located adjacent to and parallel with respective parallel sides of the channel. This arrangement ensures that the head portion and channel abutment portion are smoothly and securely guided within the channel.

The coupling device may further include at least one nib that engages with a corresponding recess in an adjustable engagement assembly, the nib and recess being arranged such that when engaged the coupling device is retained in an angular position relative to the engagement assembly suitable to enable the complete clamping assembly formed thereby to be inserted into a corresponding recess or cavity in an object to be clamped, with the coupling device oriented in said second angular position within a channel of said recess or cavity. According to this arrangement, the complete assembly may easily be preinstalled in one object in an appropriate orientation to enable rapid connection to another object having a corresponding cutaway section, including a channel to receive the coupling device.

The coupling device may be formed as a single part, or alternatively may be assembled from multiple parts. In one preferred embodiment, the coupling device is formed from two parts, the first part including the head portion and channel abutment portion, and the second part including the elongate connecting portion.

The adjustment member may be a nut or similar internally threaded member through which the elongate connecting portion may pass.

However, the cooperatively threaded adjustment member is most preferably a threaded rotatable sleeve member of an adjustable engagement assembly such as those disclosed herein and in international application no. PCT/AU03/01007.

The thread formed on the elongate connecting portion may be a left hand thread, such that the first rotational direction is counter-clockwise around the longitudinal axis as viewed from the end proximate the adjustment member. This arrangement is particularly preferred for use with an adjustable engagement assembly such as that disclosed herein, so that the clamp assembly is tightened by clockwise rotation of a first bevel gear member of said engagement assembly.

Furthermore, the present inventors have also recognised that the clamp assemblies disclosed in PCT/AU03/01007, such as assembly 300 shown in FIG. 3, do not fully satisfy the needs of users of such clamps, since there remain certain problems with these assemblies. For example, the worm gear 351 is necessarily located out-board of the shaft 340 and sleeve 356. Accordingly, the clamp member 330 must be made sufficiently wide to accommodate the worm gear 351. It is clearly desirable to minimize the size of the clamp member 330 in order to reduce the size of the cut-away portion eg A" that must be made in the surface A. The size of the clamp member can be reduced if the diameter of the worm gear 351 is reduced, however this results in a reduction of the contact area between the thread of the worm gear 351 and the teeth of the worm wheel 352. The reduced contact area results in higher stress on these components, leading to an increased probability of damage to, or failure of, the gear assembly.

There may be a very high gear ratio provided by the worm gear assembly 350, typically in the range 10-20. While this was previously perceived to be an advantage of the arrangement 350, since it enables a high clamping force to be applied with reduced torque, the inventors have now discovered that the clamping force provided by the worm gear assembly 350 is far in excess of typical requirements. Since the application of excessive force may result in damage to the surfaces A, B, and/or damage to the clamp assembly such as stripping of the thread 341 or straining of the shaft 340, the high gear ratio may be undesirable. This is especially likely to be the case when the clamp is tightened using mechanical means, such as a motorized screwdriver or drill, which may apply a relatively high torque to the worm gear 351.

Accordingly, in a further aspect, the present invention provides an adjustable engagement assembly adapted to function as a clamp member when used in a clamp assembly of the type having an elongate connection member with a threaded portion, the engagement assembly including:

a first bevel gear member having centrally a first axis of rotation;

a second bevel gear member including a central sleeve member having an internal thread for screw-thread engagement with a threaded cylindrical connection member, the second bevel gear member having centrally a second axis of rotation substantially perpendicular to said first axis and being cooperatively engaged with the first bevel gear member such that rotation of the first bevel gear member about the first axis results in rotation of the second bevel gear member about the second axis; and a housing formed to retain therein said first and second bevel gear members in cooperative engagement with one another, and having at least one external surface that, in use, abuts a corresponding surface of an object to be clamped.

There is thus provided a compact clamping engagement assembly in which all components are retained within a housing that also functions as a clamping member in an assembled clamp. In particular, by use of a bevel gear arrangement, the need for out-board gearing components that must be positioned alongside the connection member when the assembly is in use, such as the worm gear arrangement known in the prior art, is avoided. The size of the cut-away portion required to locate the engagement assembly is thereby reduced. Furthermore, the bevel gear arrangement may have approximately unity gear ratio, or any other ratio as desired, so that the application of excessive forces to the gears, screw threads and/or other clamping components, that may occur especially when using power tools to tighten the clamp, may be avoided.

A further advantage is that the engagement assembly may include all of the moving parts in a completed clamp assembly, and the cylindrical connection member may be fixed in place with the second bevel gear member being able to rotate about the connection member in engagement with the threaded portion thereof, such that the engagement assembly moves along the threaded portion. Accordingly, the engagement assembly may be used with fixed connection members such as connection members preinstalled in one of the objects to be clamped together, such as in a through-hole arrangement.

Preferably the housing is formed from a resilient material, and in particular may be manufactured cost-effectively by injection moulding from a suitable plastic.

Preferably the housing includes a cylindrical channel that passes through said external surface, which is aligned with the sleeve member of the second bevel gear member so that, in use, a threaded connection member may be received via the channel to engage with the sleeve member.

In a preferred embodiment, the first bevel gear member includes a raised projection of circular cross-section, which is retained within a slot formed in an end face of the housing, the slot consisting of a substantially semicircular end portion having a diameter corresponding to that of the raised projection and an opposing neck portion having a slight narrowing at an opening adjacent to an open side of the cavity.

It is preferred that the second bevel gear member further includes a groove disposed about a circumference, and that the housing includes two rib members disposed adjacent to the open side of the cavity and formed to engage within the groove to retain the second bevel gear member in position. In a particularly preferred embodiment, the rib members are inwardly curved and terminate in bezel-ended projections that engage within the groove.

The first bevel gear member is preferably provided with a means for connecting with a tool for rotating the gear member about its axis. The connecting means may be a recess formed in the end face of the raised projection. The recess may be shaped to engage with a rotation mechanism, such as a manual or powered screwdriver or drill having a Phillips head engaging bit.

Preferably, the internal thread of the sleeve member is a left-hand thread for engaging with a corresponding left-hand thread of a connecting member. Advantageously, this enables the clamp to be tightened by clockwise rotation of the first bevel gear member, in accordance with usual convention.

In yet another aspect, the present invention provides an adjustable clamp assembly including:

an elongate connection member having a threaded portion at one end thereof;

an adjustable engagement assembly adapted to function as a first clamp member; and a second clamp member, disposed at an end of the connection member opposed to the end having the threaded portion;

wherein the adjustable engagement assembly includes:

a first bevel gear member having centrally a first axis of rotation;

a second bevel gear member including a central rotatable sleeve member having an internal thread in screw-thread engagement with the threaded portion of the connection member, the second bevel gear member having centrally a second axis of rotation substantially perpendicular to said first axis and being cooperatively engaged with the first bevel gear member such that rotation of the first bevel gear member about the first axis results in rotation of the second bevel gear member about the second axis; and a housing formed to retain therein said first and second bevel gear members in cooperative engagement with one another, and having at least one external surface that, in use, abuts a corresponding surface of an object to be clamped so as to function as a first clamp member.

In still a further aspect, the present invention provides an adjustable clamp assembly including:

a self-aligning coupling device; and an adjustable engagement assembly operatively engaged with the coupling device such that an adjustment of the engagement assembly results in a translation of the coupling device along the longitudinal axis while simultaneously applying a torque to the coupling device about the longitudinal axis, wherein the self-aligning coupling device is suitable for installation in a channel having an open end and a pair of substantially parallel side walls, said device including:

an elongate connecting portion having a longitudinal axis;

a channel abutment portion; and at least one laterally projecting lug, arranged such that in use the coupling device may be installed in the channel with the channel abutment member located at least partially within the channel and the laterally projecting lug located outside the open end of the channel, the channel abutment portion being formed such that when aligned in a first angular position within the channel it abuts the side walls of the channel to prevent rotation of the device in a first rotational direction about said longitudinal axis, while allowing rotation in a second, opposed, rotational direction, and the lug being formed such that in said first angular position it extends beyond at least one of the side walls of the channel, whereby when the coupling device is retracted into the channel while simultaneously applying a torque to rotate the device in said first rotational direction towards said first angular position, the channel abutment portion will abut the side walls of the channel thereby aligning the lug to extend beyond at least one of the side walls of the channel to prevent the coupling device from being fully retracted into the channel.

Preferably, the elongate connecting portion of the self-aligning coupling device includes a cylindrical portion having a thread formed thereon, and the adjustable engagement assembly includes a cooperatively threaded adjustment member, whereby in use the adjustment member is in screw thread engagement with the elongate connecting portion, such that a rotation of the adjustment member results in translation of the coupling device along the longitudinal axis while simultaneously applying a torque to the coupling device about the longitudinal axis.

In preferred embodiments, the application of torque results from friction between the thread of the elongate connecting portion and the cooperative thread of the adjustment member.

Preferably, the adjustable clamp assembly includes:

a first gear member having centrally a first axis of rotation; and a second gear member having centrally a second axis of rotation substantially perpendicular to said first axis and being cooperatively engaged with the first gear member such that rotation of the first gear member about the first axis results in rotation of the second gear member about the second axis, wherein said second gear member includes an internally-threaded central rotatable sleeve member forming said cooperatively threaded adjustment member.

In a particularly preferred embodiment, the first and second gear members include bevel gear members, and the adjustable engagement assembly further includes a housing formed to retain therein said first and second bevel gear members in cooperative engagement with one another, the housing having at least one external surface that, in use, abuts a corresponding surface of an object to be clamped so as to function as a clamp member of the adjustable clamp assembly.

BRIEF DESCRIPTION OF THE DRAWINGS

Further benefits and advantages of the present invention in its various aspects will become apparent in the following description of preferred embodiments of the invention, which should not, however, be considered to limit the scope of the invention as defined by the appended claims or any of the preceding statements. In order that the invention might be more fully understood, embodiments of the invention will be described with reference to the accompanying drawings, in which:

DESCRIPTION OF PREFERRED EMBODIMENTS

Figure 4:
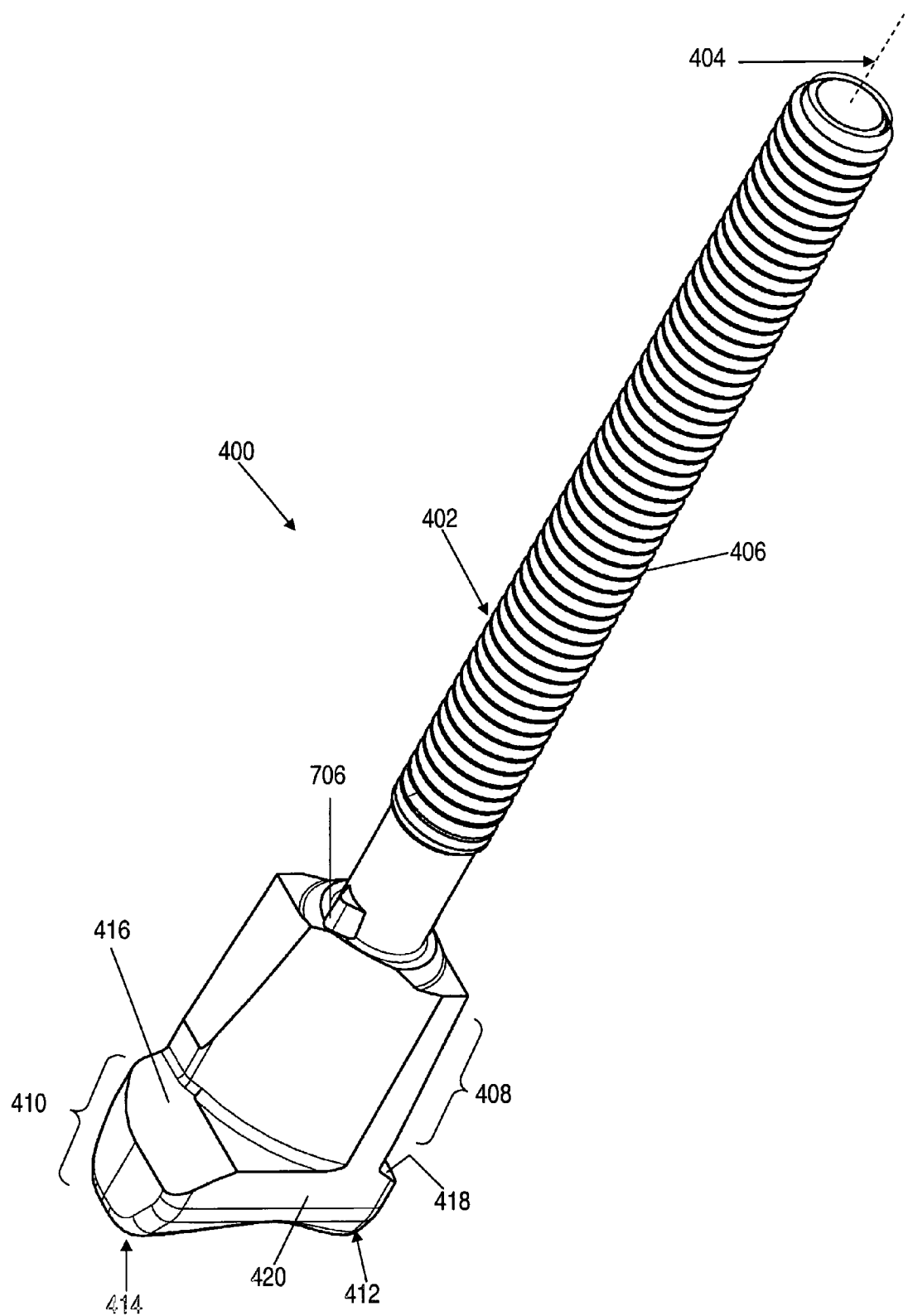
FIG. 4 shows a coupling device in accordance with a preferred embodiment of the invention.
Figure 5:
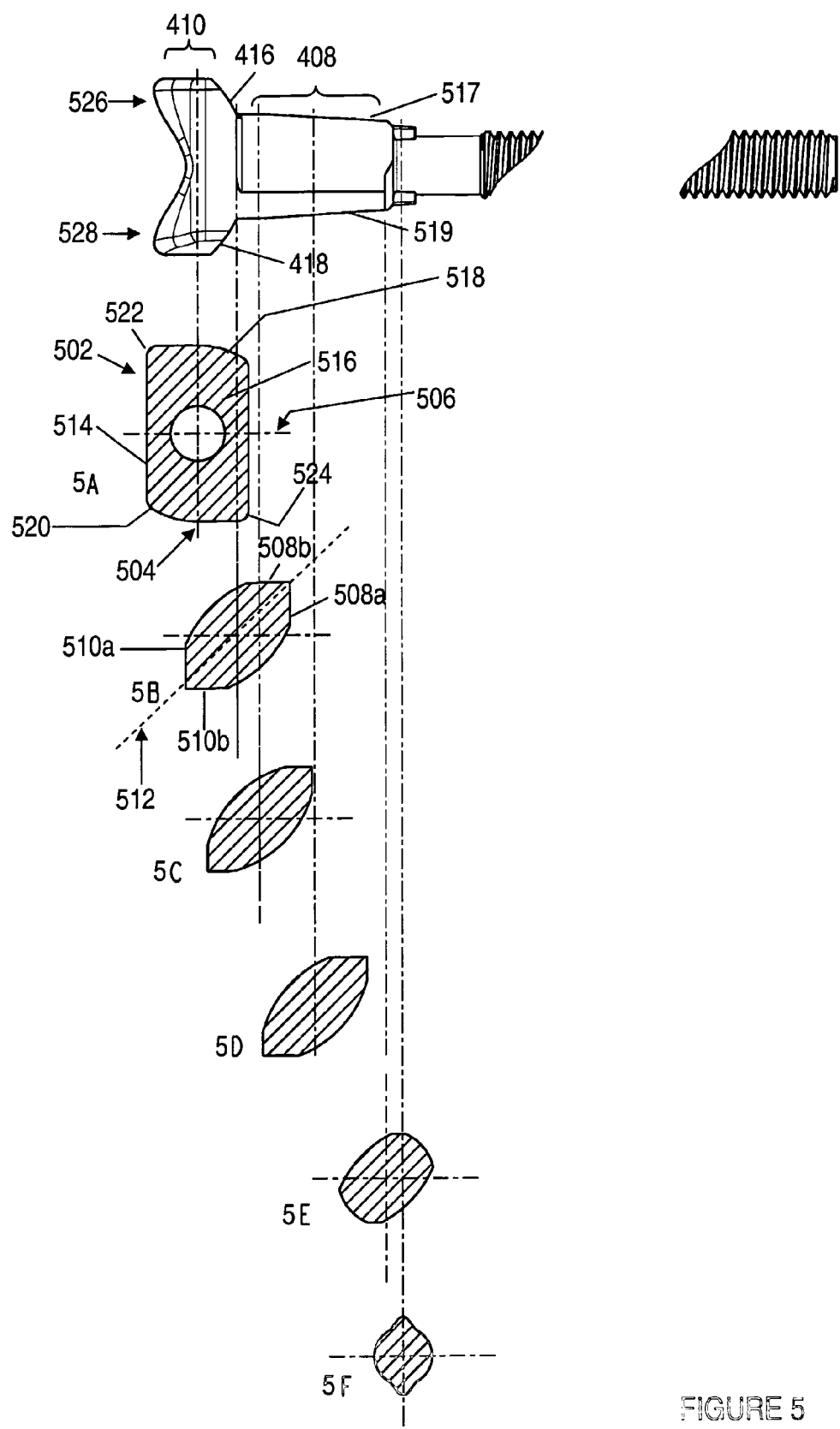
FIG. 5 shows cross-sectional views of a head portion and channel abutment portion of the coupling device of FIG. 4.

FIG. 4 illustrates a preferred embodiment of a coupling device 400 in accordance with an aspect of the present invention, while FIG. 5 shows a side view of the same coupling device, along with cross-sections taken at various distances along the device. Like reference numerals in each of the drawings indicate like components.

The coupling device 400 includes an elongate connecting portion 402, which in preferred embodiments is a cylindrical portion having a screw thread 406 formed thereon for screw thread engagement with a cooperatively threaded adjustment member. The elongate connecting portion 402 has a longitudinal axis 404.

The coupling device 400 also includes channel abutment portion 408 and head portion 410.

The head portion 410 includes two laterally projecting lugs 412, 414. The lugs are arranged such that when the coupling device 400 is installed in a channel, as will be described subsequently with reference to FIG. 8, they may be located outside an open end of the channel, and extend beyond the walls of the channel. When installed in this manner, surfaces 418, 416 may bear against corresponding surfaces adjacent to the end of the channel to prevent retraction of the coupling device 400 into the channel.

As shown in cross-section 5A of FIG. 5, head portion 410 has a substantially rectangular cross-section 502. The substantially rectangular cross-section 502 has a long dimension along major axis 504, and a short dimension along minor axis 506. The dimensions are chosen such that the head portion 410 is able to fit within a channel having substantially parallel side walls when oriented such that minor axis 506 is arranged perpendicular to the side walls of the channel. However, the width of the channel may be such that when head portion 410 is oriented with minor axis 506 parallel to the side walls, it is unable to fit within the channel.

In order to align head portion 410 in the desired manner during installation and operation of the coupling device, channel abutment portion 408 is provided, having the features shown in cross-section 5B of FIG. 5. As shown, in preferred embodiments the channel abutment portion includes a first pair of flat surfaces 508a, 508b substantially opposed to a second pair of flat surfaces 510a, 510b along an axis 512 that is oriented at 45 degrees to the major and minor axes 504 and 506 respectively of rectangular cross-section 502 of head portion 410. Each of said pairs of flat surfaces meet at right angles, such that surfaces 508a and 510a are oriented parallel to major axis 504, and surfaces 508b and 510b are oriented parallel to minor axis 506.

It is also preferred, as shown in FIG. 5, that surfaces 517, 519 of the abutment portion 408 converge slightly towards one another between the head portion 410 and connecting portion 402, such that abutment portion 408 is slightly tapered. This preferred arrangement facilitates an increased degree of relative lateral movement of two objects to be clamped together under moderate clamping force, as will be described below with reference to FIG. 8.

Figure 6A:
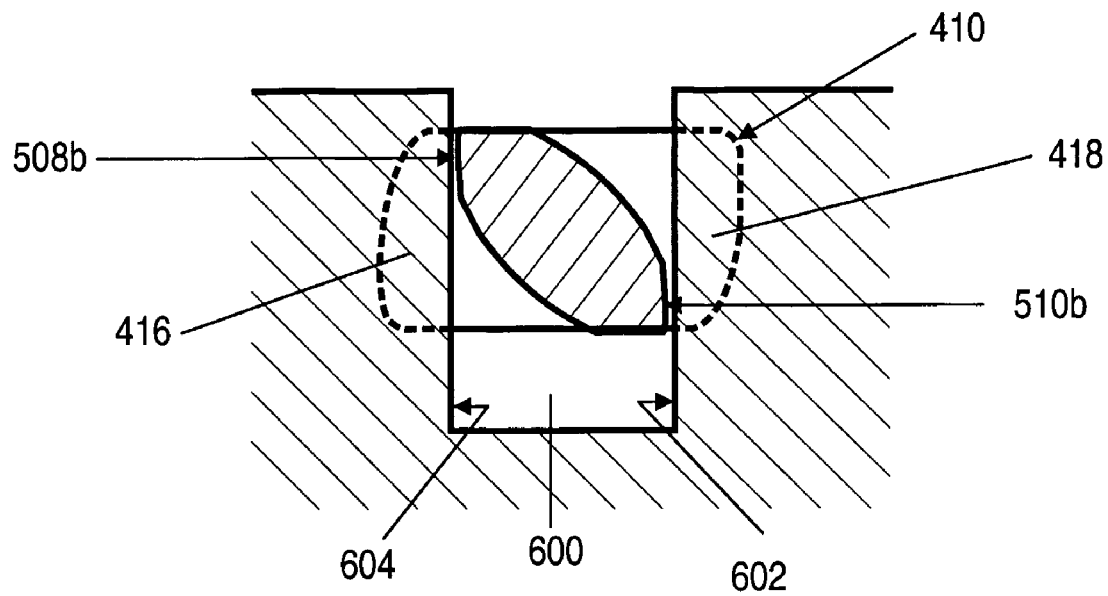
FIGS. 6A and 6B are cross-sectional views illustrating the coupling device of FIG. 4 engaged in a channel in first and second angular positions.
Figure 6B:
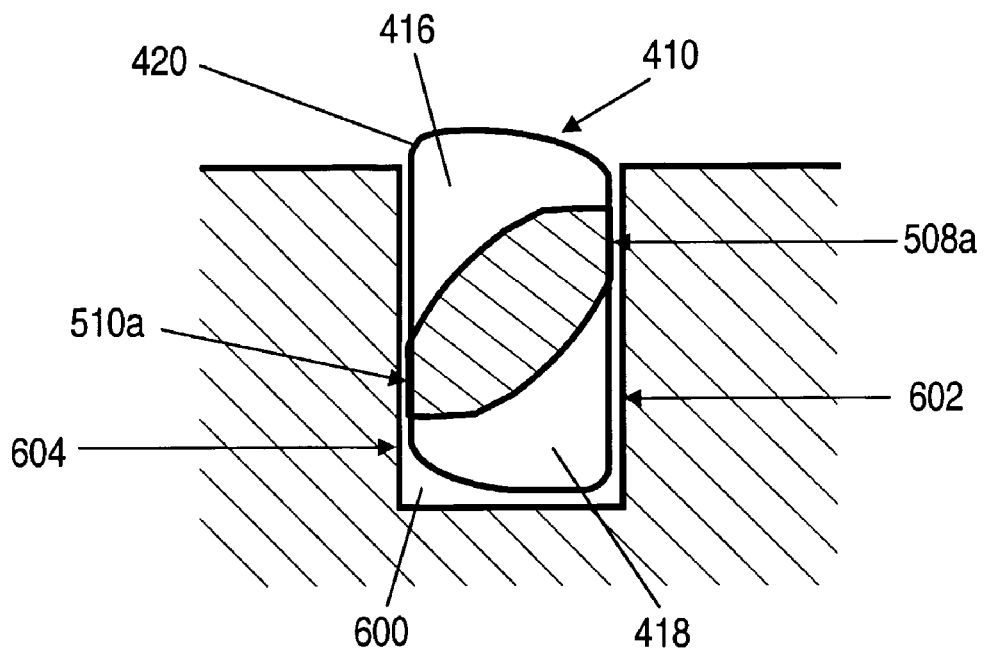

FIGS. 6A and 6B illustrate in cross-section the coupling device 400 located within a cutaway channel 600 in a first angular position and second angular position respectively around longitudinal axis 404. It should be noted that FIGS. 6A and 6B are not drawn to scale.

FIG. 6A shows coupling device 400 in a first angular position within channel 600. Oriented in this manner, surfaces 508b and 510b of channel abutment portion 408 bear against parallel side walls 602, 604 of channel 600. Accordingly, as shown in FIG. 6A the coupling device is unable to rotate within the channel in a first rotational direction, being a counter-clockwise direction, however it is able to rotate within the channel 600 in a second rotational direction, being a clockwise direction. As indicated by the broken lines in FIG. 6A, in the first angular position the head portion 410 is located beyond an open end of the channel 600, and is oriented such that it is not possible to retract the coupling device through the channel 600, due to the engagement of surfaces 418, 416 with respective corresponding surfaces adjacent to walls 602, 604 of the open end of channel 600.

Accordingly, if a counter-clockwise torque is applied to the coupling device while simultaneously attempting to retract the device through channel 600, the device will rotate into the first angular position shown in FIG. 6A and then be prevented from further rotation by engagement of surfaces 508b, 510b of channel abutment portion 408 with side walls 602, 604. Accordingly, such a process of simultaneous retraction and application of counter clockwise torque results in the coupling device self aligning within the channel 600 so as to prevent retraction of the device and causing surfaces 418 and 416 to bear against corresponding surfaces adjacent to the open end of channel 600 in order to provide a clamping force along the longitudinal axis of the device.

FIG. 6B illustrates the coupling device in a second angular position within channel 600, whereby surfaces 508a and 510a engage with channel walls 602 and 604 respectively, preventing clockwise rotation of the coupling device, while allowing it to rotate in a counter-clockwise direction about longitudinal axis 404.

In the second angular position shown in FIG. 6B, head portion 410 is oriented with major axis 504 aligned parallel to side walls 602, 604 such that the head portion 410 is able to slide freely within the channel 600.

Accordingly, by applying a clockwise torque to the coupling device 400 while simultaneously extending or retracting the device within channel 600, the coupling device will be held in the orientation shown in FIG. 6B by the engagement between surfaces 508a and 510a with parallel side walls 602 and 604 so as to maintain the alignment of major axis 504 with the side walls, and ensure that the coupling device remains able to slide freely within channel 600.

The substantially rectangular cross-section 502 of head portion 410 includes rounded or smoothed portions 518, 520 adjacent to the diagonally opposed corners corresponding to the positions of the flat surfaces 508a, 508b, 510a, 510b of the channel abutment portion 408, to prevent the head portion catching on a surface of the object in which the channel is formed during rotation between the first and second angular positions. Additionally, the remaining pair of diagonally opposed corners 522, 524, as well as end portions 526, 528 of head portion 510 are rounded and/or smoothed to ensure that there are no angular corners or edges that may catch on a surface of an object during sliding and/or rotation of the coupling device within channel 600.

Installation of the coupling device may thus be carried out as follows. The device is first oriented in the second angular position as shown in FIG. 6B. In this orientation, the coupling device may be extended through the channel 600 while simultaneously applying a clockwise torque to ensure that the device remains aligned in the channel in the second angular position. In the preferred embodiment of the coupling device 400 the flat surfaces 508*a*, 510*a* adjacent to side walls 602, 604 are continuous with corresponding side surfaces, eg 420, of head portion 410, as indicated in FIG. 4. Accordingly, during extension of the coupling device through channel 600, the device is guided smoothly and securely within the channel.

Once the head portion 410 has been extended outside an open end of the channel, surfaces 508*a*, 510*a* of the channel abutment portion 408 remain in contact with side walls 602, 604 under the influence of the clockwise torque to ensure that the head portion 410 of the coupling device remains aligned with the channel 600 in the second angular position during further extension of the device.

Following extension of the head portion 410 for a sufficient distance outside the open end of channel 600, the coupling device 400 is retracted back into the channel 600 while simultaneously applying a counter-clockwise torque. The applied torque will cause the coupling device to rotate into the first angular position shown in FIG. 6A during retraction, until flat surfaces 508*b*, 510*b* make contact with side walls 602, 604 of channel 600 preventing further rotation. In this orientation, head portion 410 is aligned across the channel, such that surfaces 416, 418 of head portion 410 will make contact with corresponding surfaces adjacent to the open end of the channel 600, preventing the coupling device from being fully retracted back into channel 600.

For optimum installation of coupling device 400, the head portion should be allowed to extend outside the open end of channel 600 during extension of the device by a sufficient distance to allow full rotation of the device from the second angular position to the first angular position under the torque applied during subsequent retraction.

The extension or retraction of the coupling device while simultaneously applying the required torque may be simply achieved through the operation of a threaded adjustment member engaged with screw thread 406 formed on cylindrical connecting portion 402 of the coupling device 400. The threaded adjustment member may be a nut or the like, however it is preferably a threaded rotatable sleeve member of an adjustable engagement assembly, such as the assembly 704 shown engaged with the thread of the cylindrical portion of coupling device 400 in FIG. 7. Operation of the engagement assembly 704 by rotation of gear member 710 results in corresponding rotation of the threaded rotatable sleeve member (not visible in FIG. 7) that is engaged by screw thread engagement with the coupling device 400. Assembly 704, and the operation thereof, will be described in greater detail below with reference to FIGS. 10 to 12.

Rotation of the threaded sleeve member will result in translation of the coupling device 400 along its longitudinal axis relative to the engagement assembly 704. However, friction between the thread of the threaded rotatable sleeve member and the thread formed on the cylindrical portion of the coupling device will simultaneously apply a corresponding torque to the coupling device about its longitudinal axis. Part or all of the thread 406 may be formed so as to be a snug fit in the threaded rotatable sleeve member of the adjustable engagement assembly, to increase the friction between the cooperative thread and therefore increase the applied torque. Alternatively, a thin coating of a substance such as wax or a lacquer may be applied to all or part of the thread 406 to provide additional friction, and enhance torque.

As shown in the drawings, in the preferred embodiment 400 the thread 406 of the coupling device is a left-hand thread. Accordingly, operation of the adjustable engagement assembly 704 to retract the head portion of coupling device 400 towards the engagement assembly 704 results in the simultaneous application of a counter-clockwise torque. Accordingly, retraction of the coupling device 400 is accompanied by a simultaneous rotation in a counter-clockwise direction, which in use as previously described will result in rotation from the second angular position to the first angular position as shown in FIGS. 6B and 6A. The use of a left-hand thread 406 is particularly preferred when the coupling device is used in a clamping assembly with adjustable engagement assembly 704, so that the clamp assembly is tightened by a clockwise rotation of the gear member 710 of the engagement assembly 704. However, it will be appreciated that the coupling device could also be provided with a standard right-hand thread, with corresponding modifications also made to channel abutment portion 408 and head portion 410 such that the first angular position is achieved by a clockwise rotation, rather than a counter-clockwise rotation, from the second angular position.

Figure 7:
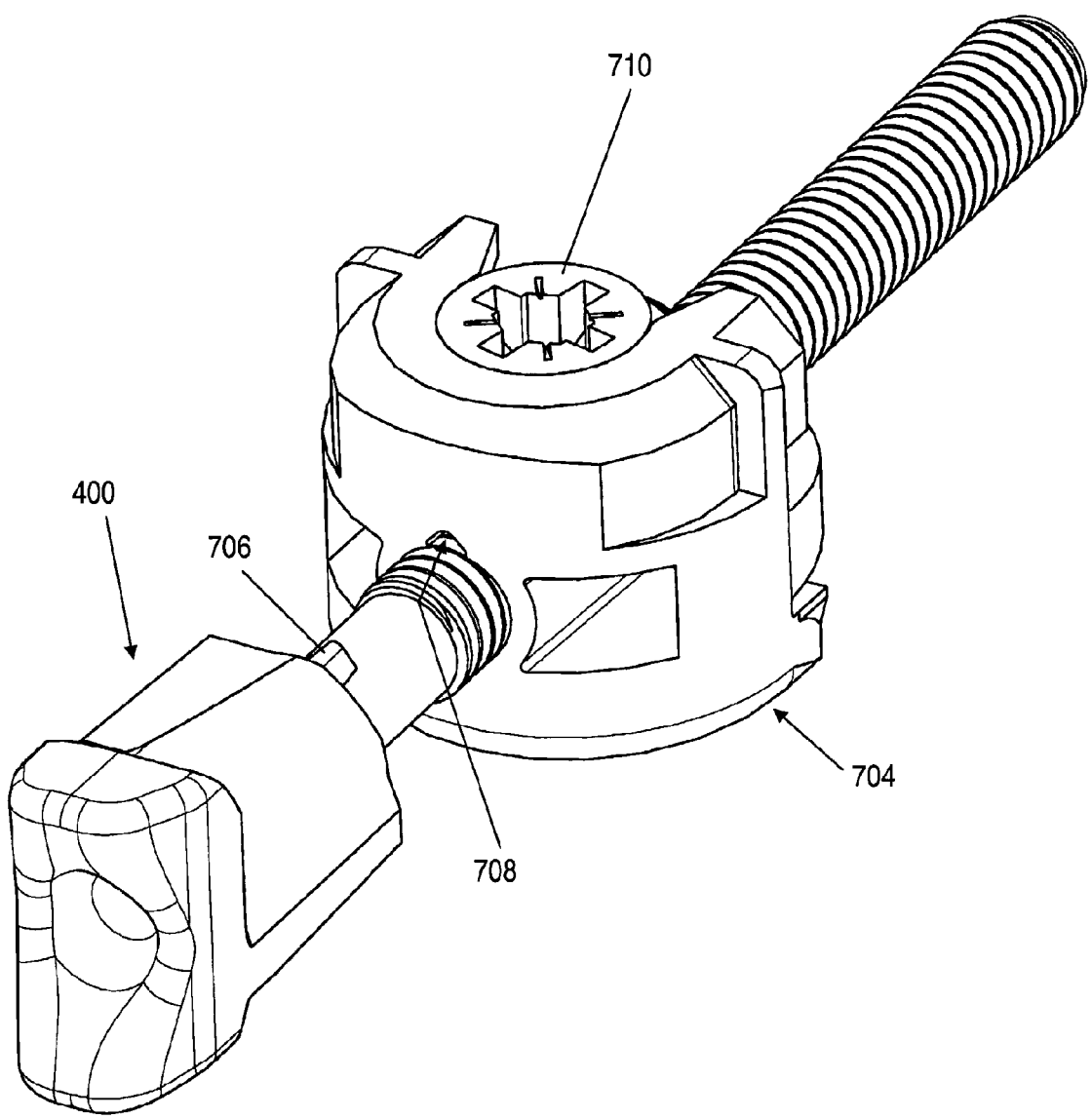
FIG. 7 illustrates the coupling device of FIG. 4 engaged with an adjustable engagement assembly.

FIGS. 4 and 7 also show nib 706 formed on the coupling device 400, that is able to engage with corresponding recess 708 of the adjustable engagement assembly 704. As can be seen, when the head portion of the coupling device is fully retracted towards the engagement assembly, the nib 706 will engage within recess 708 to maintain a fixed orientation of the coupling device relative to the engagement assembly. This orientation is suitable to insert the complete clamping assembly into a corresponding cutaway portion of an object to be clamped such that the coupling device is correctly oriented in the second angular position shown in FIG. 6B, ready for extension through a channel in the cutaway region of the object.

Figure 8:
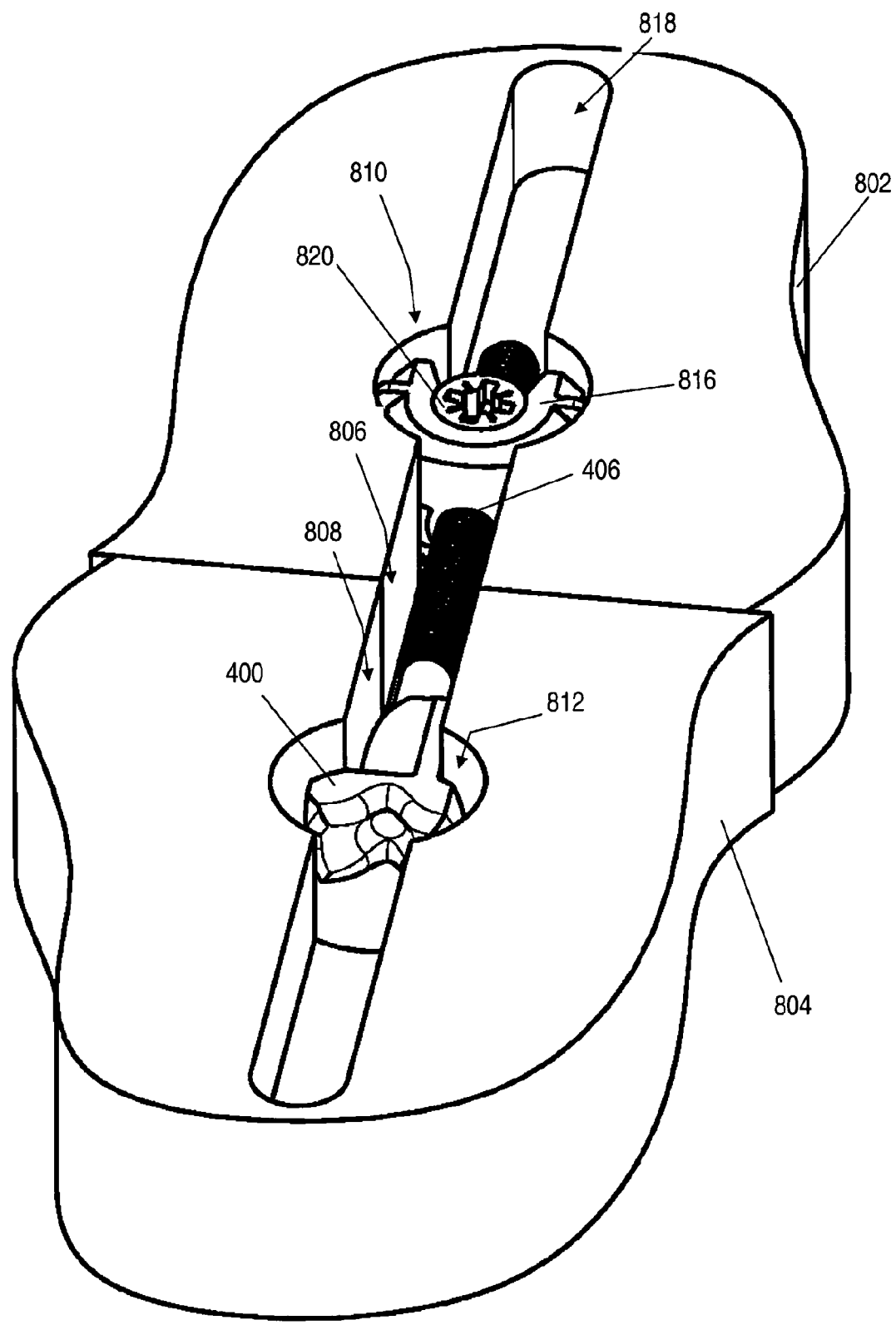
FIG. 8 illustrates a complete clamp assembly including the coupling device of FIG. 4 and an adjustable engagement assembly installed within two objects to be clamped together.

FIG. 8 shows the clamping assembly of FIG. 7 installed in cutaway portions formed in objects 802 and 804. Prior to clamping of the objects, the clamping assembly may be pre-installed within the cutaway portion of object 802, with the coupling device 400 fully retracted into cutaway channel 806. Rear channel section 818 is provided to accommodate the threaded connecting portion of the coupling device when fully retracted in this way.

The preinstalled clamping assembly may be operated to clamp objects 802, 804 together by first abutting the surfaces to be clamped such that channels 806, 808 in corresponding cutaway portions are substantially aligned. The clamping assembly is then operated in the manner previously described to extend the coupling device through channels 806, 808 until the head portion of coupling device 400 extends outside the open end of channel 808 into the circular cutaway region 812. Once the head portion of coupling device 400 is fully extended into cutaway region 812, the engagement assembly 816 is then operated so as to retract the coupling device 400, while simultaneously rotating it into the first angular position as shown in FIG. 8, whereby the surfaces 416, 418 of the head portion of the coupling device 400 bear against the inner surfaces of cutaway region 812 adjacent to the open end of channel 808. The outer surface of the housing of the engagement assembly 816 bears against corresponding inner surfaces of circular cutaway region 810. Accordingly, in the arrangement shown in FIG. 8 further tightening of the clamping assembly will result in the clamping together of objects 802, 804.

Furthermore, the clamping assembly may initially be adjusted to a degree at which a moderate clamping force is applied between the objects 802, 804, such that the objects are held together, but lateral movement of the objects with respect to one another remains possible. Under these conditions, the two objects 802, 804 may be more precisely aligned with one another by the operator prior to further adjusting the clamping assembly to clamp the objects securely together. As previously noted, the taper of abutment portion 408 created by the slight convergence of surfaces 517, 519 between the head portion 410 and connecting portion 402 facilitates an increased degree of lateral movement of the two objects for the purposes of alignment than would be the case of surfaces 517, 519 were arranged parallel with one another.

It will be appreciated that since the coupling device 400 is self aligning into the position shown in FIG. 8 upon retraction and tightening of the clamping assembly, it is not necessary to access the cutaway portion 812 in object 804 in order to correctly align the head portion of coupling device 400. Accordingly, the channel 808 and circular cut away portion 812 may be inaccessible, or even fully enclosed within object 804. Furthermore, operation of the clamping assembly to clamp together objects 802, 804 may be completed very rapidly through the use of a mechanised tool such an electric screw driver or electric drill having a screwdriver bit. The tool is applied to adjustable engagement assembly 816 first on a setting normally used to loosen a screw, applying a counter clockwise rotation to the rotatable gear 820 to extend the coupling device, and then switched to the opposite setting to retract and align the coupling device, and clamp the two objects together.

Figure 9:
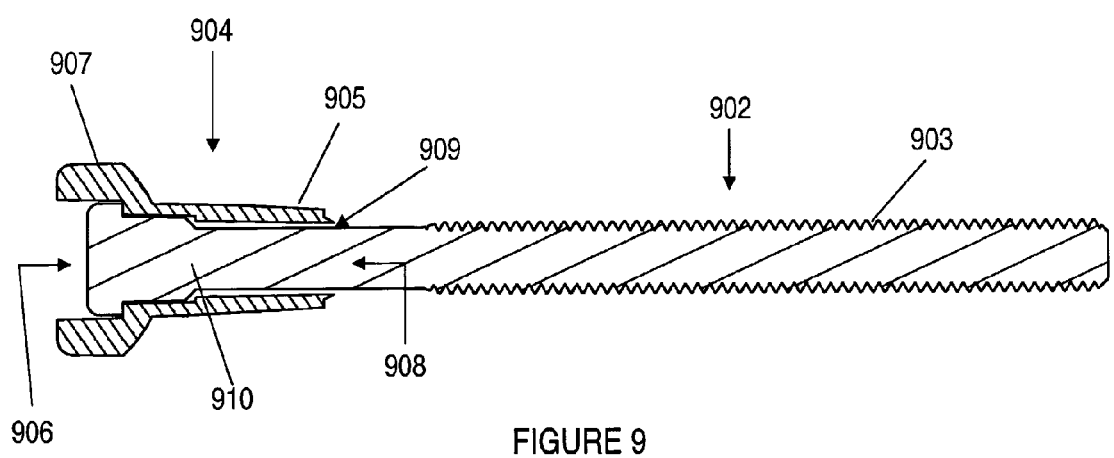
FIG. 9 illustrates an alternative embodiment of a coupling device, in which the coupling device is formed in two parts.

FIG. 9 illustrates in cross section an alternative embodiment of a coupling device 900 which is formed from two separate parts 902, 904. First part 902 includes a cylindrical connection portion having a screw thread 903 formed thereon, in like manner to screw thread 406 formed on the connecting portion 402 of the first embodiment 400. Second part 904 includes integrally formed channel abutment and head portions 905, 907 similar to corresponding portions 408, 410 of the first embodiment 400.

A substantially cylindrical channel 908 is formed through second part 904, having an opening 906 through which first part 902 may be passed. The diameter of the cylindrical channel 908 is stepped and/or tapered between opening 906, and the opening 909 at the opposing end of the channel 908 (blocked by first part 902 in FIG. 9). First part 902 includes a corresponding stepped and/or tapered portion 910 formed at an end thereof, such that when the first part 902 is pushed through channel 908, the outer surfaces of portion 910 bear against the inner surfaces of channel 908 to prevent the first part 902 from passing completely through the second part 904. Accordingly, the two parts 902, 904 become wedged together to form the coupling device 900. Optionally, small serrations, (not shown), may be included on the outer surface of wedge-shaped portion 910 and/or the inner surface of tapered channel 908, such that parts 902, 904 may be more securely lodged together.

Furthermore, when the two-part coupling device 900 is used in a clamping assembly, the wedge-shaped portion 910 of first part 902 will be more tightly drawn into the tapered channel 908 by the clamping action, such that the assembly is secure in use, and the two parts 902, 904 cannot come apart as the clamp is tightened.

One potential advantage of the alternative embodiment of the coupling device 900 is that it may be possible to reduce the cost of manufacture, since the two parts 902, 904 may be manufactured separately, and of different materials. For example, first part 902 may be formed by rolling a thread onto a rod made from a suitable metal. Second part 904 may be separately formed, e.g. from aluminium, by a die casting process.

Figure 10:
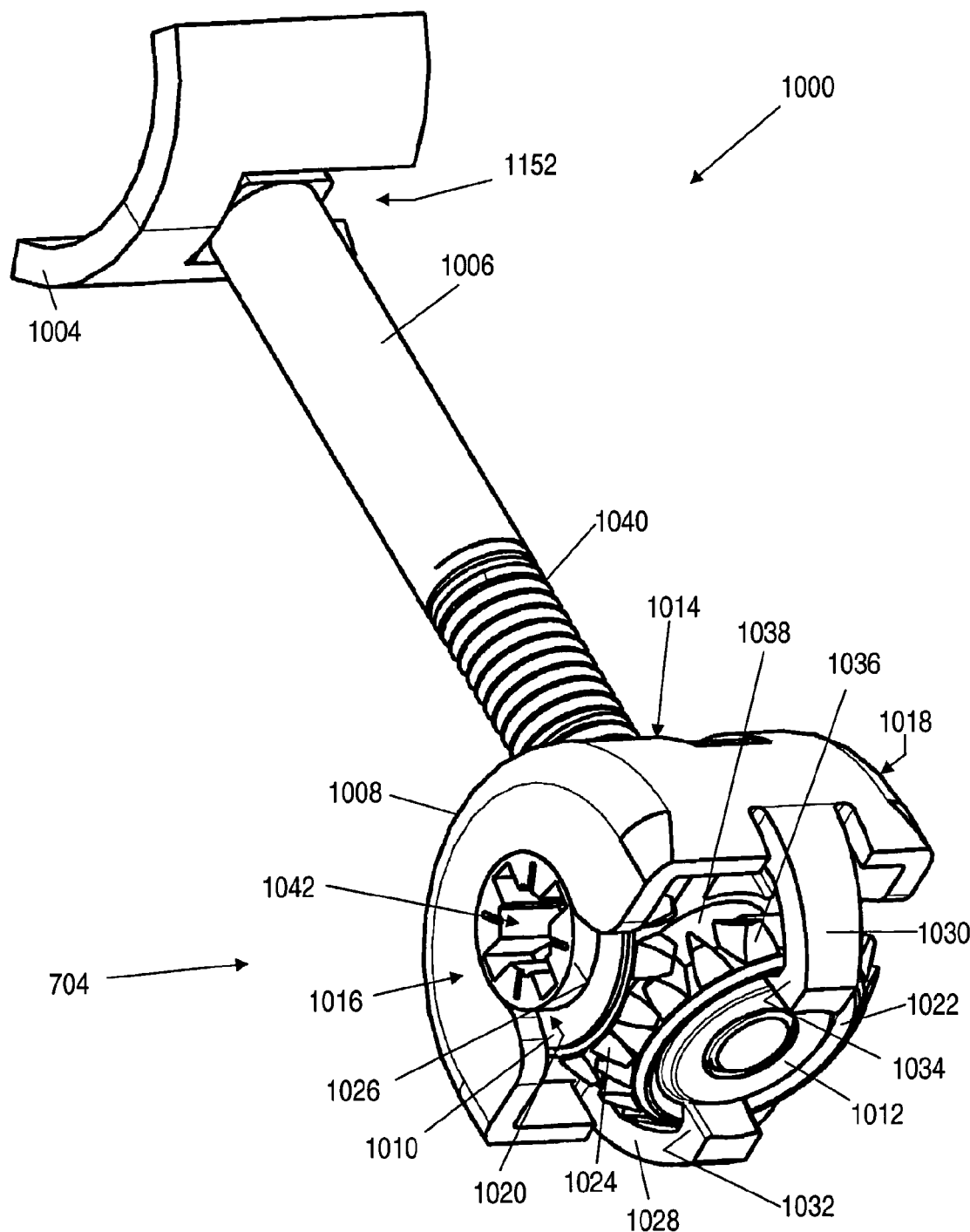
FIG. 10 is a perspective view of another complete clamp assembly including the adjustable engagement assembly shown in FIG. 8.
Figure 11:
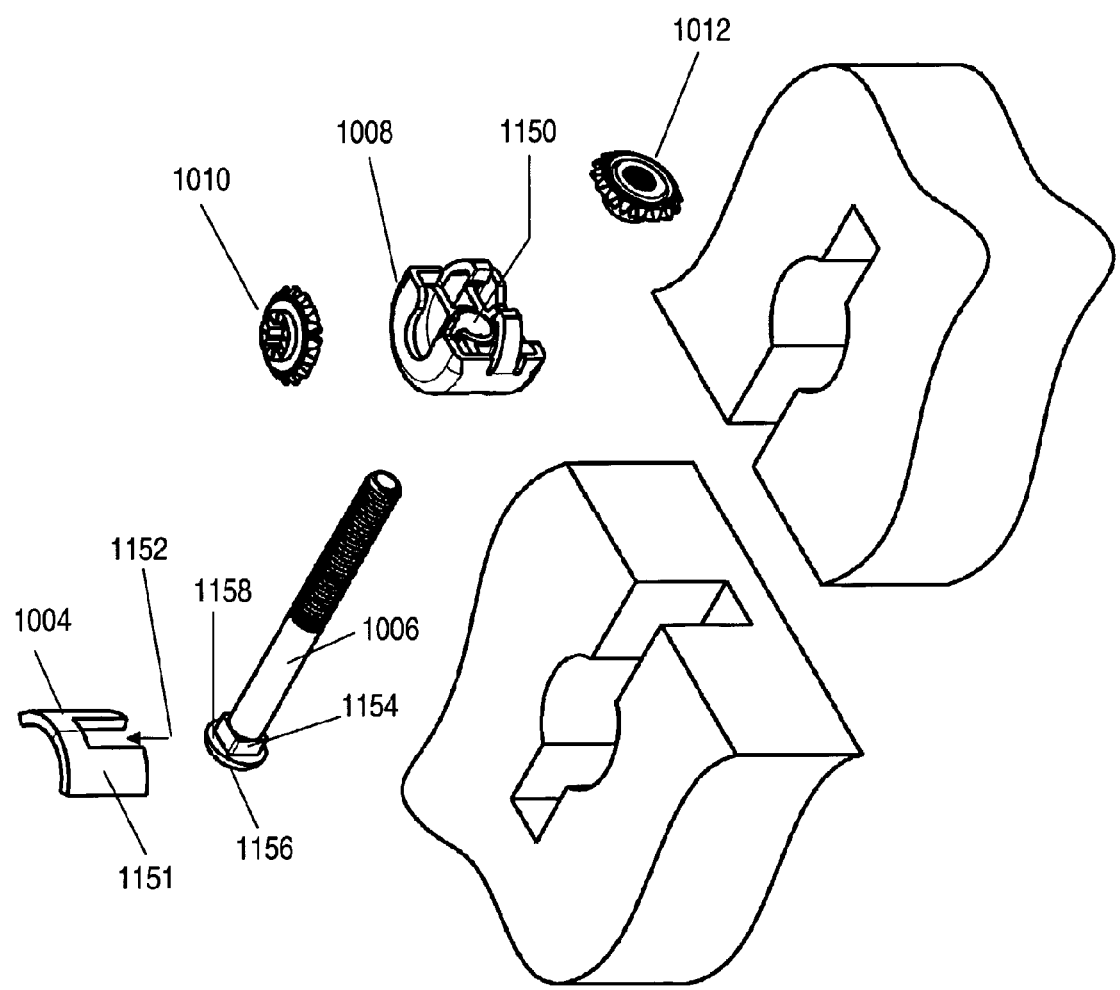
FIG. 11 is an exploded view of the clamp assembly of FIG. 10, along with cut-away portions suitable for fitting the clamp assembly.

To more clearly illustrate the structure and operation of the engagement assembly 704 shown in FIGS. 7 and 8, FIG. 10 illustrates an embodiment 1000 of a clamp assembly including a non-self-aligning interconnecting shaft 1006, and the engagement assembly 704. FIG. 11 shows an exploded view of the clamp assembly of FIG. 10 showing the separate parts, along with cut-away portions suitable for fitting the clamp assembly. Like reference numerals in each of the drawings indicate like components.

The embodiment 1000 includes three main components: the adjustable engagement assembly 704 that acts as a first clamp member; a second clamp member 1004; and an interconnecting shaft 1006 of a conventional, non-self-aligning type.

The adjustable engagement assembly 704 includes a housing 1008, and first and second gear members 1010, 1012, which in the embodiment shown are bevel gears, although it will be appreciated that other gear arrangements, such as worm gears, may be used.

In the preferred embodiment 704, the housing 1008 is formed of a resilient material. For example, the housing 1008 may be injection moulded from a suitable plastic, which advantageously provides for a simple manufacturing process and accordingly low production cost.

The housing 1008 is formed such that a curved outer surface 1014 thereof is able to abut a corresponding curved surface of a cut-away portion formed in an object to be clamped. The housing 1008 also includes opposed end faces 1016, 1018 which bracket the curved clamping surface 1014. The clamping surface 1014 and end faces 1016, 1018 form the outer surfaces of a wall that surrounds an interior cavity of the housing 1008, the cavity being open at the side opposed to the surface 1014.

A cylindrical channel 1150 is formed in the housing 1008, passing through the clamping surface 1014 and emerging at the open side of the cavity. When the clamp is assembled, the shaft 1006 passes through the channel 1150. The diameter of the channel 1150 is slightly larger than that of the shaft 1006, so that the shaft is able to slide and/or rotate freely within the channel.

The first bevel gear member 1010 includes a toothed bevel wheel 1024, formed integrally and coaxially with a raised projection 1026 having a circular cross-section. The cavity of the housing 1008 includes a portion adjacent to end face 1016 that is formed in a shape complementary to that of the bevel wheel 1024. A slot 1020 is formed in the end face 1016 of the housing 1008, the slot consisting of a substantially semicircular end portion having a diameter corresponding to that of the raised projection 1026, and an opposing neck portion having a slight narrowing at an opening adjacent to the open side of the cavity. Due to the resilience of the material from which the housing 1008 is formed, the neck portion is able to flex temporarily to allow the raised projection 1026 of the first bevel gear member 1010 to be inserted into the slot 1020. When cooperatively engaged in the slot in this manner, the first bevel gear member 1010 is able to rotate, about a first axis parallel to the shaft 1006, however movement parallel to the axis of the shaft 1006 is restrained by the slight narrowing in the neck of slot 1020, while movement perpendicular to the axis of the shaft is restrained by the walls of the housing.

The second bevel gear member 1012 includes a toothed bevel wheel 1036 formed integrally and coaxially with a central rotatable cylindrical sleeve member 1038 having an internal thread (not shown). The bevel gear member 1012 and central sleeve member 1038 are able to rotate about their common axis, which is a second axis substantially perpendicular to the first axis parallel to the shaft 1006 of first gear member 1010. The interconnecting shaft 1006 includes a threaded portion 1040 at one end thereof, which connects, in use, by screw-thread engagement with the sleeve member 1038 of the second bevel gear member 1012.

The second bevel gear member 1012 also includes a groove 1022 disposed circumferentially adjacent to the teeth of the bevel wheel 1036. The housing 1008 includes two rib members 1028, 1030 disposed adjacent to the open side of the cavity and extending away from the clamping surface 1014. The rib members 1028, 1030 are inwardly curved, and terminate in bezel-ended projections 1032, 1034. Due to the resilience of the material from which the housing 1008 is formed, the rib members 1028, 1030 are able to flex temporarily to allow the second bevel gear member 1012 to be inserted into the cavity of the housing 1008 such that the projections 1032, 1034 engage within the groove 1022 with the threaded interior of the sleeve 1038 aligned with the channel 1150.

Accordingly, when the clamp assembly is in use the shaft 1006 passes through the channel 1150 so that the threaded portion 1040 engages with the internal thread of the sleeve 1038. The teeth of the bevel wheel 1036 of the second bevel gear member 1012 mesh with the teeth of the bevel wheel 1024 of the first bevel gear member. The second bevel gear member 1012 is held in place by engagement with the shaft 1006, with the projections 1032, 1034 of the ribs 1028, 1030, and with the first bevel gear member 1010. The engagement of the second bevel gear member 1012 with the first bevel gear member 1010 also assists in retaining the first bevel gear member 1010 firmly in place within the slot 1020. Thus when fully assembled, the engagement assembly forms a highly stable and robust structure in which all component parts are cooperatively held firmly in place.

The first bevel gear member 1010 is further provided with a means for connecting with a tool for rotating the gear member 1010 about its axis. In the preferred embodiment, the connecting means is a recess 1042 formed in the end face of the raised projection 1026, the recess being shaped to engage with a rotation mechanism, such as a manual or powered screwdriver or drill having a Phillips head engaging bit. It will be appreciated, however, that other formations may be provided for engaging with other types of rotation mechanism, such as standard flat-head engaging bits, spanner or socket heads, or Allen keys.

When the clamp assembly 1000 is fully assembled, rotation of the first bevel gear member 1010 through application of torque using a suitable rotation mechanism, results in rotation of the second bevel gear member 1012, through the cooperative engagement of the teeth of the first bevel gear member 1010 with those of the second bevel gear member 1012. Accordingly, if the shaft 1006 is restrained from rotating, then the rotation of the second bevel gear member 1012 will result in translation of the shaft 1006 along its axis by means of the screw thread engagement between the integral sleeve 1038 and the threaded portion 1040 of the shaft 1006.

Preferably, the shaft 1006 is provided with a left-hand thread, so that clockwise rotation of the first bevel gear member 1010 by the rotation mechanism results in tightening of the clamp, in accordance with usual convention.

Through being arranged in this preferred manner, the housing 1008 is adapted in accordance with the invention to retain the bevel gear members 1010, 1012 in cooperative engagement with one another in a manner that substantially minimises the space occupied by the gear assembly, while also acting as a first clamp member of the complete clamp assembly 1000. Accordingly, the embodiment 1000 provides a particularly compact structure that enables the size of the cut-away portion to be substantially reduced in comparison to prior art clamp assemblies.

In the preferred clamp assembly 1000, the second clamp member 1004 includes a curved surface 1151 for engaging with a corresponding surface of a cut-away portion. A rectangular slot 1152 is formed in one side of the second clamp member 1004 at approximately the centre of the curved face. A shoulder 1154 having a square section is provided proximate to the end of the rod 1006 opposed to the threaded portion 1040, and a round head 1156 is formed behind the shoulder 1154, having a flat surface 1158 adjacent to the shoulder 1154.

Accordingly, when the second clamping member 1004 is slotted over the square shoulder as shown, the head 1156 rests against the second clamp member 1004, preventing movement of the rod 1006 through the slot 1152, and the sides of the shoulder abut the walls of the slot 1152. This arrangement ensures that the rod 1006 is not able to rotate relative to the second clamp member 1004 when the first bevel gear member 1010 is rotated causing the second bevel gear member 1012 and sleeve 1038 to rotate.

Of course, when engagement assembly 704 is used with self-aligning coupling device 400, as shown in FIGS. 7 and 8, the coupling device 400 may initially rotate relative to the second clamp member 1004 when the first bevel gear member 1010 is rotated, as previously described, until the coupling device 400 is aligned in either the first or second angular position within a channel, e.g. 806, 808, such that further rotation is prevented.

Figure 12:
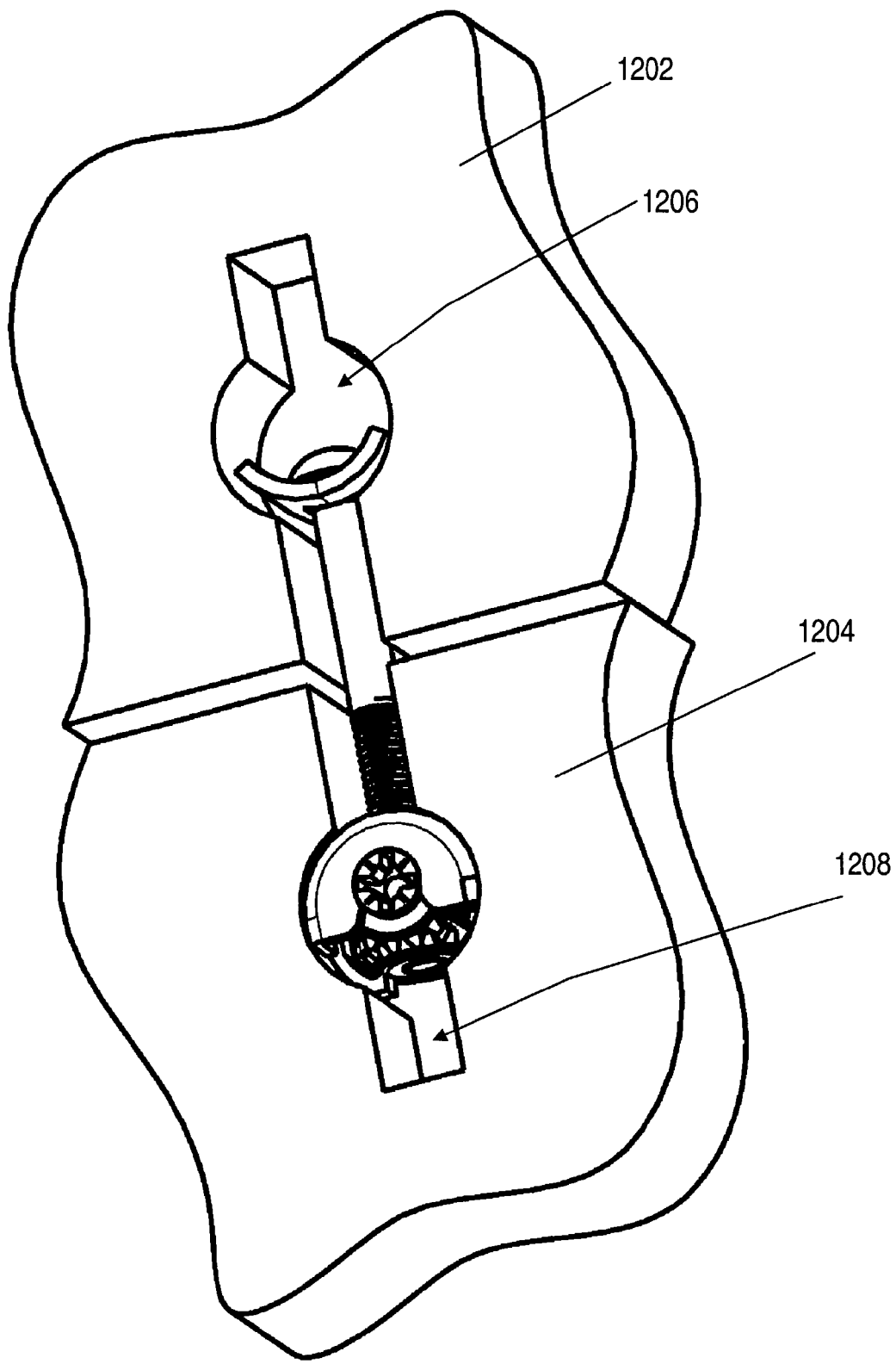
FIG. 12 shows the clamp assembly of FIG. 10 when fully assembled and located within suitable cut-away portions.

In FIG. 12, the clamp assembly 1000 of FIGS. 10 and 11 is shown fully assembled and inserted into suitable cut-away portions 1206, 1208 formed in two flat objects 1202, 1204. The figure illustrates that the exterior surface of the housing 1008, including the ribs 1028, 1030, and the opposed surface of the second clamp member 1004, all have the form of circular arcs. Accordingly, the clamp assembly 1000 can be fitted within cut-away portions consisting only of straight sections to accommodate the shaft 1006 and circular portions to accommodate the engagement assembly 704 and second clamp member 1004.

Furthermore, the complete engagement assembly 704 is sufficiently compact to be able to fit within a circular cut-away portion of a size suitable to accommodate the second clamp member 1004. Thus there is no need to cut larger cut-away portions only to accommodate the engagement assembly. Since circular cut-away portions are generally simpler, and therefore cheaper, to form than more irregular shapes, there is no additional cost penalty incurred by providing a complete circular cut-away portion for the second clamp member 1004. Overall, therefore, the clamp assembly 1000 may reduce the cost of clamping together flat objects by the cut-away method.

Additionally, it can be demonstrated that clamping assembly 1000 achieves the aforementioned advantages while also providing for sufficient clamping force to meet the requirements of typical applications, without providing excessive clamping force that may result in damage to the clamping assembly, or the objects to be clamped together.

The clamping force can be related to the applied tightening torque using the well-known torque-tension relationship:

$$T=FDK$$

In the foregoing equation, T is the applied torque, F is the resulting clamping force, D is the effective diameter of the threaded shaft, and K is the torque-tension coefficient, or so-called "nut factor".

For a uniform screw thread, without defects of variations in friction, the nut factor may be calculated from:

$$K = \frac{1}{2}\left(\frac{p + \pi\mu D \sec \alpha}{\pi D - \mu p \sec \alpha}\right)$$

In the foregoing equation, p is the pitch of the screw thread, μ is the coefficient of friction between the threaded members, and α is the angle of the screw thread.

Figure 1:
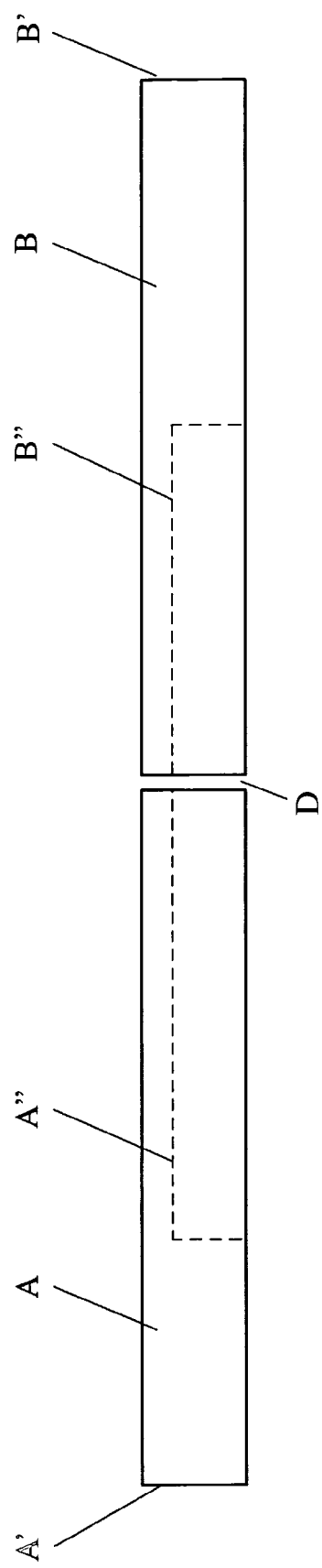
FIG. 1 is a side view of two flat objects which are to be clamped together end to end.
Figure 2:
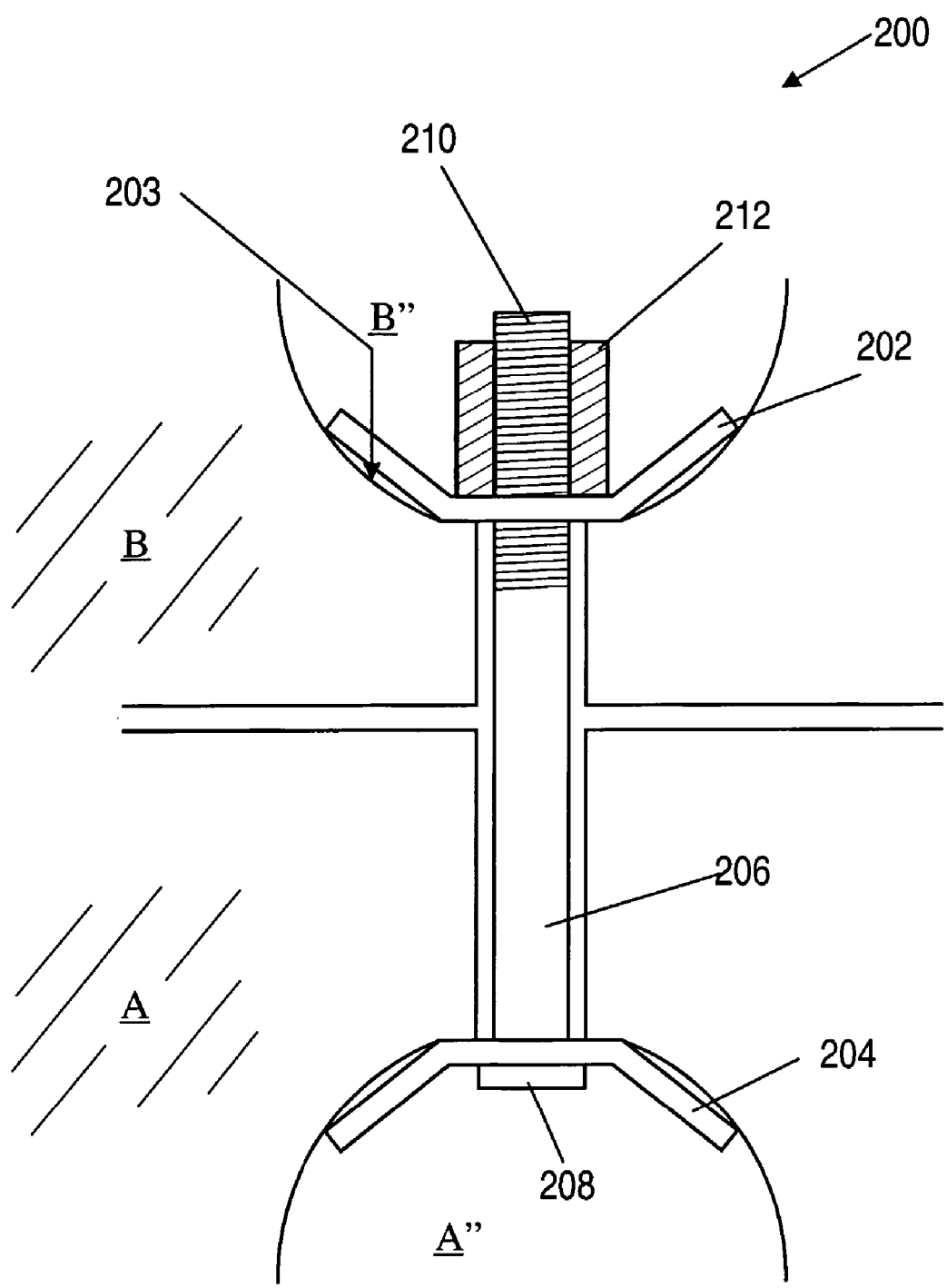
FIG. 2 is a plan view of a prior art clamp assembly positioned in a cut-away portion.

Considering firstly the prior art clamp as shown in FIG. 2, for a standard metric M6 thread, D=5.459 mm, p=1 mm and α=30 degrees. The coefficient of friction μ typically varies between 0.1 and 0.2. Accordingly, K is in the range 0.17496 to 0.29319.

If a force of 5 kg (50 N) is applied using a ring spanner 100 mm in length, to produce a torque of 5 Nm, the clamping force using the prior art clamp 200 will be between 6248 N and 10470 N.

This calculation does not take into account the loss due to friction between the nut 212 and the clamping member 202. If this friction is accounted for, assuming an effective diameter of the nut to be about 8 mm, then the minimum clamping force is reduced from 6248 N to approximately 3124 N.

Figure 3:
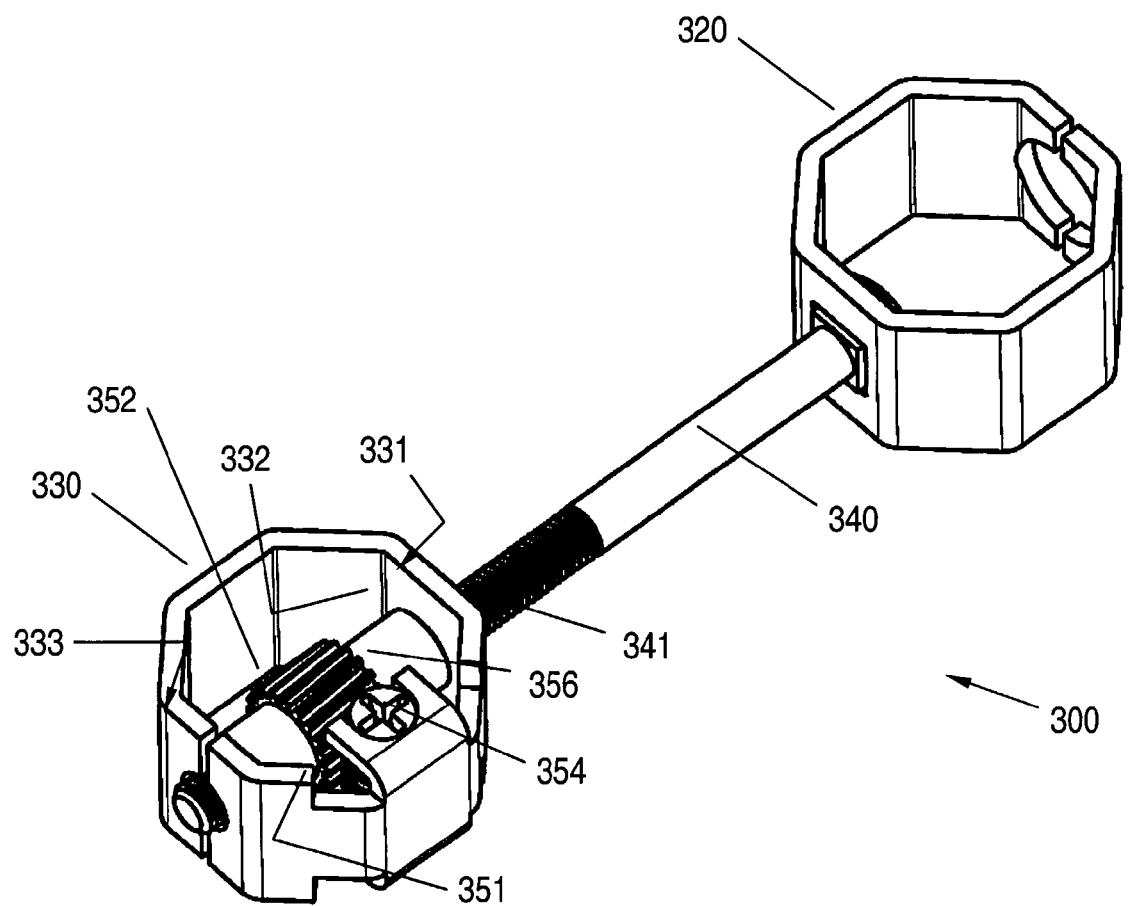
FIG. 3 is a perspective view of another prior art clamp assembly.

If the worm gear arrangement of the clamp 300 shown in FIG. 3 is employed, then the gear ratio is typically in the range 10-20. Assuming the gear efficiency (due to friction) is in the range 0.2 to 0.4, if a torque of 5 Nm is applied to the worm drive assembly, for example using a cordless drill, then the torque applied to the worm wheel 352 (corresponding to the nut 212 in the clamp 200) is between 10 Nm and 40 Nm. This provides a clamping force between 15620 N and 62480 N. This is clearly an excessive force, in view of the fact that the clamp 200, although awkward to use, is known to provide adequate clamping force for typical applications. Indeed, such high force creates a risk of damage to the screw thread, gears or other components of the assembly, particularly when power tools are used for tightening.

Since the bevel gear arrangement of the present invention will typically have close to 1:1 ratio between the two gear members 1010, 1012, the clamping force applied by the arrangement will be of similar magnitude to that provided by the well-known clamp 200. There will be a slight reduction in force, due to the losses resulting from friction between the bevel gears, however this will be compensated to some degree by the fact that the clamp of the present invention can be tightened using a power tool, such as a cordless drill or power screwdriver, which should allow a larger torque to be applied in most cases than would be possible by the use of a spanner with the prior art clamp 200.

It will be appreciated that the foregoing embodiments have been advanced by way of example only, and modifications are possible within the scope of the invention. For example the connecting portion of a self-aligning coupling device may be other than a cylindrical threaded portion, and may be formed in other shapes able to be held and operated to apply the required torque and translation of the coupling device. Also, in alternative arrangements, the channel abutment portion of a self-aligning coupling device need not be formed integrally with a head portion, and may be located along the coupling device at another position in which it will remain within the channel while the head portion, or other arrangement of one or more laterally projecting lugs, extend beyond an open end of the channel.

Furthermore, while the clamp assemblies described and depicted in the drawings are installed in cut-away portions formed in objects to be clamped together, it will be appreciated that an engagement assembly incorporating a gear arrangement as described may be employed with suitable connection members in other arrangements. For example, an engagement assembly as described herein may be engaged with a threaded portion of a connection member that has been preinstalled in an end of one of the objects to be clamped together, or that has been installed into an object using a through-hole rather than cut-away arrangement. Additionally, while the drawings generally depict the use of clamp assemblies for holding together substantially planar articles, such as bench-top sections, it will be appreciated that such clamp assemblies may be used to hold together other articles, such as sections of handrails, and other sections that may be assembled into a complete product or article by way of clamp assemblies installed therebetween.

It is therefore to be understood that the described and depicted embodiments are exemplary only, and should not be taken as limiting of the invention, which is defined in the claims appended hereto.

The invention claimed is:

1. An adjustable clamping assembly comprising:
    a first object having a first channel of a first width longitudinally extending within a first surface of said first object, said first channel having a first opening disposed at an edge of said first surface and having a first cutaway region disposed at an intermediate location of said first channel distal said first opening and defining front and rear portions of said first channel;
    a second object having a second channel of a second width longitudinally extending within a second surface of said second object, said second channel having a second opening disposed at an edge of said second surface and having a second cutaway region disposed at a location of said second channel distal said second opening;
    said first object and said second object being positioned such that said edges of said first and second surfaces face one another and such that said first and second channels and said first and second openings are longitudinally aligned;
    a self-aligning coupling device comprising an elongate connecting portion positioned within said first and second channels and extending through said first and second openings, said elongate connecting portion having a threaded portion at a first end and a head portion having an end fixedly connected to a second end of said elongate connecting portion, a free end of said head portion comprising at least a first lug having opposing lateral surfaces, wherein the distance between said opposing lateral surfaces defines a width that is less than said first width and said second width;
    an engagement assembly positioned within said first cutaway region of said first channel and operably associated with said elongate connecting portion, said engagement assembly comprising a gear member engaging said threaded portion of said elongate connecting portion, wherein actuation of said gear member longitudinally translates said elongate connecting portion within said first and second channels;
    wherein in a first position of use, said gear member rotates in a first direction to translate said elongate connecting portion such that said head portion moves longitudinally away from said first object within said second channel toward said second cutaway portion, and said opposing lateral surfaces of said first lug are generally aligned with sidewalls of said first and said second channels such that the head portion is prevented from rotating as said elongate connecting portion translates within said first and said second channels; and wherein in a second position of use, said first lug is translated to a position within said second cutaway portion of said second channel and said gear member is rotated in a second direction to rotate said head portion such that said opposing lateral surfaces are positioned at an angle relative to said sidewalls of said second channel and such that said first lug abuts a sidewall of said second cutaway portion, wherein rotation of said gear member in said second direction translates said elongate connecting portion such that said threaded portion of said elongated connecting portion extends into the rear portion of said first channel and such that said head portion moves longitudinally toward said first object, pulling said first and said second objects together.

2. The adjustable clamping assembly of claim 1 further comprising a second lug having an end interconnected to, or integral with, said elongate connecting portion and positioned opposite said at least a first lug.

3. The adjustable clamping assembly of claim 1 wherein said head portion comprises a rectangular cross section with rounded corners.

4. The adjustable clamping assembly of claim 1 wherein one or more edges and corners located at the end of said head portion are rounded or smoothed.

5. The adjustable clamping assembly of claim 1 wherein said self-aligning coupling device comprises at least one nib for engagement with a corresponding recess in said engagement assembly, said nib and said recess being arranged such that when engaged, said self-aligning coupling device is retained in an angular position relative to said engagement assembly corresponding with said first position of use when the engagement assembly is inserted into said first cutaway region.

6. The adjustable clamping assembly of claim 1 wherein said head portion is selectively interconnected to said self-aligning coupling device.

7. The adjustable clamping assembly of claim 1 wherein said threaded portion of said self-aligning coupling device is formed such that torque is applied thereto due to friction between said threaded portion and a cooperative thread of said engagement assembly.

8. The adjustable clamping assembly of claim 7 wherein the threaded portion formed on said elongate connecting portion is manufactured so as to be a snug fit with the cooperative thread of said engagement assembly such that friction is increased therebetween.

9. The adjustable clamp assembly of claim 1 wherein said engagement assembly comprises:

a first gear member having a first axis of rotation; and a second gear member having centrally a second axis of rotation substantially perpendicular to said first axis of rotation and being cooperatively engaged with said first gear member such that rotation of said first gear member about said first axis results in rotation of said second gear member about said second axis, wherein said second gear member comprises an internally-threaded central rotatable sleeve member that engages said threaded portion of said elongate connecting portion.

10. The adjustable clamp assembly of claim 9 wherein said first and said second gear members comprise beveled portions, and said engagement assembly further comprises a housing formed to retain said first gear member and said second gear member, said housing having at least one external surface that, in use, abuts a corresponding surface of said first cut away portion of said first object.

11. The adjustable clamping assembly of claim 1 further comprising a channel abutment portion on said elongate connecting portion and positioned between said head portion and said threaded portion of said self-aligning coupling device that travels within said first channel and said second channel.

12. The adjustable clamping assembly of claim 11 wherein said channel abutment portion has a first position of use within said first or said second channel wherein said channel abutment portion is adapted to engage at least one of said sidewalls of said first channel or said second channel such that rotation of said at least a first lug about a longitudinal axis of said self-aligning coupling device in a first angular direction is prevented.

13. The adjustable clamping assembly of claim 11 wherein said channel abutment portion includes two pairs of flat surfaces, each pair of surfaces meeting at an edge therebetween and said pairs being substantially opposed to each other relative to a longitudinal axis of said self-aligning coupling device.

14. The self-aligning coupling device of claim 13 wherein said each of said pair of surfaces meet at right angles and are arranged such that in each of said first and second angular positions one of each of said pairs of surfaces contacts at least one sidewall of said first channel or said second channel.

15. The adjustable clamping assembly of claim 11 further comprising a second lug having an end interconnected to, or integral with, said elongate connecting portion and positioned opposite said first lug;

wherein said head portion has a substantially rectangular cross section;

wherein said channel abutment portion comprises two pairs of flat surfaces, each pair of surfaces meeting at an edge and said pairs being substantially opposed to each other relative to the longitudinal axis of said self-aligning coupling device; and wherein said pairs of surfaces are opposed along an axis oriented at 45 degrees to major and minor axes of said rectangular cross section.

16. The adjustable clamping assembly of claim 15 wherein said channel abutment portion is tapered, such that a width thereof proximate to the head portion is greater than a width proximate to said self-aligning coupling device.

17. The adjustable clamping assembly of claim 15 wherein said channel abutment portion is formed integrally with said head portion, such that one of each of said pairs of surfaces is continuous with a corresponding surface of said head portion located on a side parallel to said major axis of said substantially rectangular cross section.

* * * * *